US012810251B2

(12) United States Patent
Creager et al.

(10) Patent No.: US 12,810,251 B2
(45) **Date of Patent: *Nov. 24, 2026**

(54) DATA PROCESSING SYSTEM AND METHOD FOR MANAGING ENTERPRISE INFORMATION

(71) Applicant: iPaladin, LLC, St. Petersburg, FL (US)

(72) Inventors: Jill Creager, St. Petersburg, FL (US); Rafal Sniezynski, St. Petersburg, FL (US); Gene Diveglia, St. Petersburg, FL (US)

(73) Assignee: iPaladin, LLC, St. Petersburg, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/794,689

(22) Filed: Aug. 5, 2024

(65) Prior Publication Data

US 2024/0394660 A1 Nov. 28, 2024

Related U.S. Application Data

(63) Continuation of application No. 18/299,874, filed on Apr. 13, 2023, now Pat. No. 12,314,903, which is a (Continued)

(51) Int. Cl.

| | |
|---|---|
| ***G06Q 10/10*** | (2023.01) |
| ***G06F 16/21*** | (2019.01) |
| ***G06F 16/28*** | (2019.01) |

(52) U.S. Cl.

CPC ........... *G06Q 10/10* (2013.01); *G06F 16/211* (2019.01); *G06F 16/282* (2019.01)

(58) Field of Classification Search

CPC ..... G06Q 10/10; G06F 16/211; G06F 16/282; G06F 2221/2141; G06F 16/219; G06F 16/2477; G06F 21/6218

(Continued)

(56) References Cited

U.S. PATENT DOCUMENTS 6,868,425 B1 * 3/2005 Bergstraesser ........ G06F 16/289 707/999.103
8,612,406 B1 12/2013 Said et al.

(Continued)

FOREIGN PATENT DOCUMENTS

| | | | |
|---|---|---|---|
| EP | 1811441 | A1 | 7/2007 |
| WO | 2000077667 | A2 | 12/2000 |

OTHER PUBLICATIONS

U.S. Appl. No. 18/299,874, filed Apr. 13, 2023.
U.S. Appl. No. 17/006,127, filed Aug. 28, 2020.
U.S. Appl. No. 15/888,117, filed Feb. 5, 2018.

*Primary Examiner* — Phong H Nguyen

(74) *Attorney, Agent, or Firm* — DICKINSON WRIGHT PLLC

(57) ABSTRACT

A method for enterprise information management includes receiving first input information, from a first user, that corresponds to a first identifying a first feature of an organization. The method further includes generating, using the first input information, a first data object that represents the first feature of the organization. The method further includes generating a second data object based on second input information. The method further includes hierarchically associating the second data object with the first data object using the first input information and the second input information. The method further includes generating output information, in response to a second user accessing the first data object, based on the first data object, the second data object, and contact information associated with the second user. The method further includes displaying the output information on a display.

20 Claims, 29 Drawing Sheets

Related U.S. Application Data continuation-in-part of application No. 17/006,127, filed on Aug. 28, 2020, now Pat. No. 11,631,051, which is a continuation of application No. 15/888,117, filed on Feb. 5, 2018, now Pat. No. 10,789,572.

(60) Provisional application No. 62/456,735, filed on Feb. 9, 2017.

(58) Field of Classification Search
USPC .................................................. 707/736, 803
See application file for complete search history.

(56) References Cited

U.S. PATENT DOCUMENTS

| | | | | |
|---|---|---|---|---|
| 8,799,229 | B2 | 8/2014 | Grondin et al. | |
| 9,043,696 | B1 | 5/2015 | Meiklejohn et al. | |
| 10,909,625 | B2 | 2/2021 | Decanini et al. | |
| 11,887,192 | B2 | 1/2024 | Decanini et al. | |
| 2004/0010514 | A1* | 1/2004 | Agarwal | G06F 16/289 707/999.104 |
| 2005/0028006 | A1 | 2/2005 | Leser | |
| 2006/0143220 | A1 | 6/2006 | Spencer | |
| 2010/0251340 | A1* | 9/2010 | Martin | G06F 9/541 726/4 |
| 2012/0246130 | A1 | 9/2012 | Schmidt | |
| 2013/0082959 | A1 | 4/2013 | Shimazu et al. | |
| 2013/0339399 | A1 | 12/2013 | Dorris | |
| 2014/0012883 | A1 | 1/2014 | Bloesch | |
| 2014/0059017 | A1 | 2/2014 | Chaney | |
| 2014/0067453 | A1* | 3/2014 | Bufi | G06Q 10/10 705/7.19 |
| 2014/0101134 | A1* | 4/2014 | Bohrer | G06Q 30/02 707/E17.014 |
| 2014/0165195 | A1* | 6/2014 | Brdiczka | G06F 21/552 726/23 |
| 2014/0236637 | A1 | 8/2014 | Tan-Torres | |
| 2015/0089385 | A1 | 3/2015 | Radhakrishnan | |
| 2015/0199367 | A1 | 7/2015 | Hammer | |
| 2015/0227518 | A1 | 8/2015 | Kallan | |
| 2015/0301698 | A1* | 10/2015 | Roques | H04L 41/22 715/736 |
| 2016/0004605 | A1 | 1/2016 | Ahn et al. | |
| 2016/0253759 | A1 | 9/2016 | Decanini et al. | |
| 2024/0428337 | A1 | 12/2024 | Decanini et al. | |

* cited by examiner

100

200

FIG. 8
Collection A
John Russell
Revocable Trust
Collection A-1
CS Brokerage
Collection A-2
40% Interest in
Russell Family
REIT, LLC
Doc
A-1
Collection B
Russell Family
Dynasty Trust
Collection B-1
ABC Brokerage
Collection B-2
20% Interest in
Russell Family
REIT, LLC
Doc
B-1
Step 1d:
New Collection added

FIG. 27
Compliance Coll B-2
Asset Review (annual)
Due Date 01/25/17 1/25/18 1/25/19 1/25/20
Russell Dynasty Trust
20% Int Russell Family REIT, LLC
Linked Items:
Doc AB-2 Sales Agreement
Doc BA-4 Wire of closing funds
Doc B-6 Third Amd Op Agr for Buyer
Comments
Add the following Compllance responsibilities:
1. Verify receipt of financials from LLC Manager (quarterly)
2. Reconcile FMV of LLC interest (quarterly)
3. Verify receipt of Form K-1 (annual)
4. Review completed trust tax return for FMV adjustments (annual)

DATA PROCESSING SYSTEM AND METHOD FOR MANAGING ENTERPRISE INFORMATION

CROSS-REFERENCES TO RELATED APPLICATIONS

This Continuation Patent Application claims the benefit and priority to Continuation-In-Part Patent application Ser. No. 18/299,874 filed Apr. 13, 2023 which claims the benefit and priority to U.S. Continuation patent application Ser. No. 17/006,127 filed Aug. 28, 2020 now U.S. Pat. No. 11,631,051 issued Apr. 18, 2023, which claims priority to U.S. patent application Ser. No. 15/888,117 filed Feb. 5, 2018 now U.S. Pat. No. 10,789,572 issued Sep. 29, 2020, which claims priority to U.S. Provisional Patent Application Ser. No. 62/456,735 filed Feb. 9, 2017, the entire disclosures of which are hereby incorporated by reference.

TECHNICAL FIELD

This disclosure relates to data processing systems and methods for managing enterprise information.

BACKGROUND

An enterprise information management office may manage asset and liability information for an organization. For example, an enterprise information management office may include a family office which may provide: asset management; family governance management; property management; art, yacht, and aircraft management; reporting; insurance planning; risk management; trust and partnership administration; record keeping; tax returns and projections; coordinate estate planning and other legal matters; philanthropy management; personal security; reputational risk; family education; and/or travel, meetings, events, and concierge services; for a family. For example, a single family office may provide asset and trust management services for a single family over multiple generations of the family.

Enterprise information management offices may utilize various disparate and disconnected technologies to manage day-to-day operations of assets and liabilities associated with an organization utilizing the enterprise information management office. For example, a family office may rely on email, spreadsheets, calendars, and/or other disconnected technologies for managing obligations, both legal and customer oriented, of a family associated with the family office. This may result in excess overhead, work inefficiency, and/or an inability of professionals operating within the family office to meet the obligations of the family.

SUMMARY

This disclosure relates generally to enterprise information management.

An aspect of the disclosed embodiments is a method for enterprise information management. The method includes receiving, by a server computing device, first input information, from a first user using a client computing device, that corresponds to a first feature of an organization and generating, by the server computing device and using the first input information, a first data object that represents the first feature of the organization. The method also includes generating, by the server computing device, a second data object based on second input information and hierarchically associating, by the server computing device, the second data object with the first data object using the first input information and the second input information. The method also includes storing, by the server computing device, a relationship between the first data object and the second data object in a first database during a first period and storing, by the server computing device, first metadata associated with at least one of the relationship between the first data object, the first data object, and the second data object in the first database, the first metadata corresponding to metadata associated with the at least one of the relationship between the first data object, the first data object, and the second data object during the first period. The method also includes, in response to a request from a second user during a second period to retrieve, for the first period, a version of at least one of the first data object and the second data object, generating version information using at least the first metadata and based on permissions associated with the second user, displaying, on the client device, the version information.

Another aspect of the disclosed embodiments includes a system for enterprise information management. The system includes a memory and a processor. The memory includes instructions executable by the processor to: receive first input information, from a first user using a client computing device, that corresponds to a first feature of an organization; generate, using the first input information, a first data object that represents the first feature of the organization; generate a second data object based on second input information; hierarchically associate the second data object with the first data object using the first input information and the second input information; store a relationship between the first data object and the second data object in a first database during a first period; store first metadata associated with at least one of the relationship between the first data object, the first data object, and the second data object in the first database, the first metadata corresponding to metadata associated with the at least one of the relationship between the first data object, the first data object, and the second data object during the first period; in response to a request from a second user during a second period to retrieve, for the first period, a version of at least one of the first data object and the second data object, generating version information using at least the first metadata; and based on permissions associated with the second user, display the version information.

Another aspect of the disclosed embodiments includes a non-transitory computer-readable storage medium that includes executable instructions that, when executed by a processor, facilitate performance of operations, comprising: receiving first input information, from a first user using a client computing device, that corresponds to a first feature of an organization; generating, using the first input information, a first data object that represents the first feature of the organization; generating a second data object based on second input information; hierarchically associating the second data object with the first data object using the first input information and the second input information; storing a relationship between the first data object and the second data object in a first database during a first period; storing first metadata associated with at least one of the relationship between the first data object, the first data object, and the second data object in the first database, the first metadata corresponding to metadata associated with the at least one of the relationship between the first data object, the first data object, and the second data object during the first period; in response to a request from a second user during a second period to retrieve, for the first period, a version of at least one of the first data object and the second data object, generating version information using at least the first metadata; and based on permissions associated with the second user, displaying the version information.

These and other aspects of the present disclosure are disclosed in the following detailed description of the embodiments, the appended claims and the accompanying figures.

BRIEF DESCRIPTION OF DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

An enterprise information management office may provide enterprise information management to an organization. An enterprise information management office may include a family office (e.g., a single family office (SFO) or a multi-family office (MFO)). A family office may provide management services to a family utilizing the family office. Management services may include managing enterprise information. Managing enterprise information may include, but is not limited to: asset management; family governance management; property management; reporting; insurance planning; risk management; trust and partnership administration; record keeping; tax returns and projections; coordinate estate planning and other legal matters; philanthropy management; personal security; reputational risk; family education; and/or travel, meetings, events, and concierge services; for a relatively wealthy family. For example, an SFO may provide asset and trust management services for a wealthy family and may operate to provide management of enterprise information across multiple generations of a wealthy family.

Typically, the enterprise information management office participates in day-to-day activities of the organization the enterprise information management office represents. For example, a family office participates in day-to-day activities of a family's controlled businesses and/or assets.

Complexity managing the day-to-day activities has long been the primary characteristic of the enterprise information management office infrastructure, and experienced professionals have long been required to successfully navigate this complexity using time honored fiduciary principles and practices. As a result of: more regulation; threats of legal and tax challenges; the global expansion and diversity of organizational members, asset classes, entity structures, and jurisdictional choices, the complexity of the day-to-day operations of an enterprise information management office has increase. Additionally, stakeholders are more engaged and seek greater transparency and accountability for the integrity of enterprise information management office systems of internal controls that support decisions and governance.

Figure 1:
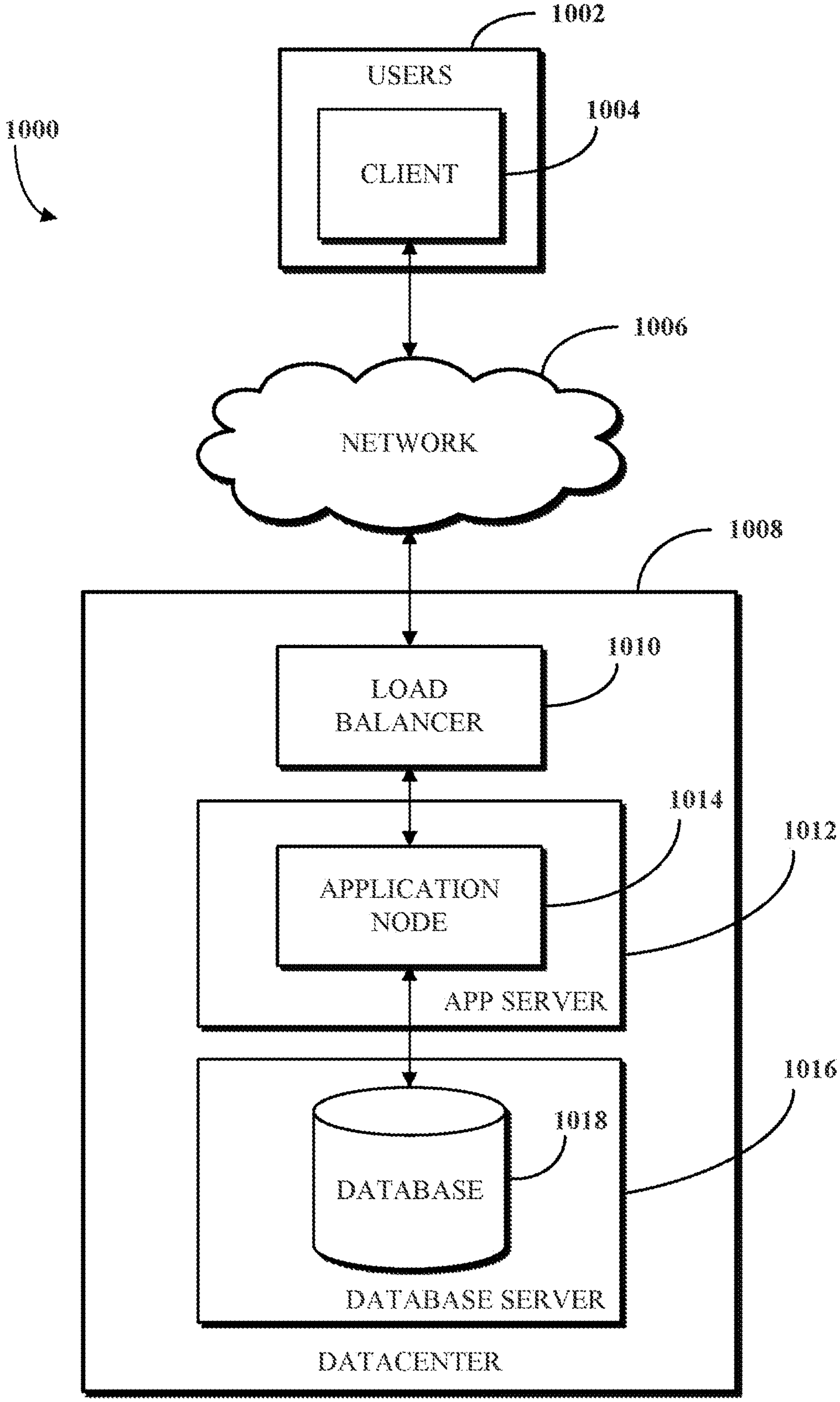
FIG. 1 is a block diagram of an example of an electronic computing and communications system.

Typically, enterprise information management office functions that support governance, operations, reporting, and compliance have relied on email, manual processes, generic calendar applications, spreadsheets, and various combinations thereof, which has created a technology void for enterprise information management offices, and in particular, to family office functions. This technology void has resulted in slow, inefficient, and sometimes, inaccurate or incomplete work product. Accordingly, a system that is configured to close this technology gap and improve efficiency, speed, accuracy, and other aspects of an enterprise information management office, such as the enterprise information management system 1000, as is generally illustrated in FIG. 1, may be advantageous.

In some embodiments, an enterprise information management system ("EIM system"), according to the principles of the present disclosure, may be used by an enterprise information management office, such as a family office, to manage information, such as, documents, tasks, calendars, emails and other communications, tax information, legal obligations, other suitable information, or a combination thereof. The EIM system may include one or more databases, one or more application program interfaces (API), a web based front end, and/or a backend platform. The EIM system may comprise various systems, such as computing systems, cloud based systems, Internet based systems, and/or other suitable systems. For example, the EIM system may utilize REST APIs (which may send and receive JSON objects), GO platform systems, JavaScript, and/or SQL database systems. The principles of the present disclosure described herein may be implemented in one or more computing systems, such as the systems described in FIGS. 1 and 2, or other suitable computing systems.

In some embodiments, databases, such as PostgreSQL databases, associated with the EIM system may store encrypted documents, non-encrypted documents, other suitable documents, and/or a combination thereof. The EIM system, according to the principles of the present disclosure, is configured to solve the aforementioned technological problems facing enterprise information management offices, such as, family offices. The EIM system digitally introduces control to the complexity of family office operations, reporting and compliance which leads to improved efficiencies and risk mitigation. Architecture associated with the EIM system is adapted and/or configured to meet the unique technology requirements of an enterprise information management office, such as, a family office. Every feature of an organization, which includes, but is not limited to, organizational member, entity, person, object, asset, and/or liability, can be separately managed within its own collaborative environment. Additionally, or alternatively, every organizational member, entity, asset, and/or liability may be governed by a unique set of data rules for its interactions and transactions and its own participants subject to a sophisticated user access system adapted to support all required roles from executive governance to mail clerks.

In some embodiments, the EIM system may be configured to provide data versioning, which may provide the capability to introspect the state of knowledge represented in the EIM system at any given point in time (e.g., during any period) to understand how or why the pre or post conditions are related to a change in knowledge which is of interest to a subsequent user (e.g., a user accessing the EIM system subsequent, or at a later date or later period, than when the data was stored).

In some embodiments, the EIM system may be configured to accurately represent a state of knowledge at any given point of time (e.g., or period), by preserving raw data as it existed during a particular point in time and, at least, various metadata associated with the raw data (e.g., more than just the raw data as it existed at any point in time). For example, a user of the EIM system may desire to be able to determine who had access to the various data of interest and what level of access existed at the given point in time (e.g., as, generally, the process involved in making decisions based upon data involves more than one user or person, understanding risk or motivation involved in a decision which resulted in a change to the data or knowledge represented in the system is vital to understanding the complete context of the point in time of interest).

Such an assessment typically requires knowledge of who had access to the information and who had the capability to add or remove data at the given point in time. In some instances, even the foregoing is not sufficient to fully comprehend the context surrounding a change at the given point in time. As the EIM system and the data associated therewith evolves over time, the retrieval and display of knowledge as information may change over time. Additionally, or alternatively, the business rules used to interpret the raw data stored in the database may change over time (e.g., as data migrations and conversions are a routine part of system and software development, it is possible for the raw structured data in the database to experience significant changes in semantics, such that the meaning is not the only factor driving raw data structure). Additionally, or alternatively, efficiency, space, and/or utility may also drive the structure of raw data. Changes driven by such factors may significantly alter the interpretation of such data over a long period.

Accordingly, the EIM system may be configured to minimize the impact of such changes, and to preserve the semantic meaning of data contained in versions. In some embodiments, the EIM system may be configured to capture knowledge and context by capturing, as metadata, information indicating semantic meaning of the raw data. In some embodiments, the metadata may describe or indicate the semantic significance of each part of the raw data. Additionally, or alternatively, the metadata may be captured at the time a version is created, to ensure that business rules and raw data structure interpretation in effect at the time of creation of the version are used to apply metadata to the raw data and thus preserve as much of the semantic meaning as possible.

In some embodiments, the EIM system may use or generate metadata that is inclusive of all means of imparting context and semantics to the raw data. Additionally, or alternatively, this may include, by way of non-limited example only, how the data is structured, how it is presented to the user visually (e.g., as font fact, font size, position, and color, and the like all impart relations and relative significance), descriptive data labels (e.g., which may impact the meaning and semantics of data within an ontology appropriate to the type of information stored in the database), other relevant information, or a combination thereof.

In some embodiments, the EIM system may be configured to select an ontology and/or other means of metadata described above, which do not experience much shift in interpretation over long periods (e.g., as the subject matter and overall context of the information stored within the database for a given use case does not change over time). In this manner, the EIM system may be configured to preservation context information and provide a relatively stable method of preserving knowledge and its interpretation.

In some embodiments, the EIM system may be configured to store relationships between smart objects persevered by the EIM system, store the user comments attached such smart objects, store hierarchal categorization of such smart objects, store other suitable information, or a combination thereof. The EIM system may be configured to create a specific context for the interpretation of the data contained within the smart object using the various stored, associated, information of the smart objects.

In some embodiments, the EIM system may be configured to employ a deliberate use of font size, font face, color, other suitable information, or a combination thereof as well as relative physical position to create associations of relative importance, locality, and/or direct relationships that may also be stored as metadata. Additionally, or alternatively, the result of the EIM system applying business logic to the stored raw data, may allow the EIM system to reify very specific meanings of the fields within the recorded data that relate directly to the semantic interpretation and understanding of the data at the time it was recorded. Such reified meanings may closely represent human understanding of the knowledge recorded in the EIM system. Additionally, or alternatively, the reified meanings may be consistent with an ontology that represents the type of information stored in the database.

In some embodiments, the EIM system may build, generate, create, and/or store the metadata when a new version of a record (e.g., smart object or other data in the EIM system) is generated and/or recorded. The EIM system first interprets the data using business logic. The EIM system may render the data into the form and structure that the EIM system will display to a user of the EIM system.

In some embodiments, the EIM system may build, generate, create, and/or store the metadata using universal timestamp attached to the data to ensure that its temporal location is preserved accurately relative to other concurrent changes occurring in the EIM system.

In some embodiments, the EIM system may build, generate, create, and/or store the metadata by analyzing and annotating the metadata with descriptive tags which associate the objective meaning of each field in the metadata with an element of the ontology used to represent knowledge in database and/or EIM system.

In some embodiments, the EIM system may build, generate, create, and/or store the metadata by additionally, or alternatively, analyzing and annotating the metadata with information that describes a grouping of fields, a relative importance and relationship of fields within groups, a relative importance and relationships between groups, other suitable annotations, or a combination thereof. In this manner, the EIM system may attempt to preserve the subjective context represented in a visual display of information a user may see at the time the version is created. This may improve reproduction similar context when the user views the information at a later point in time (e.g., or later period).

In some embodiments, the EIM system may be configured to generate various elements for managing and presenting versioned data. In some embodiments, for a given period of interest to the user, the EIM system may be configured to consider for display only versions of records active at a selected point in time. In some embodiments, the EIM system may be configured to preserve, as versioned data, the database and/or a user permissions database. Such preserved versioned data may be used by the EIM system to accurately display which users were active in the EIM system at the given point in time and what permissions these users possessed at the given point in time. This may allow the EIM system to reconstruct what the users were able to do, see, access, consume, and the like at the given point in time.

In some embodiments, the EIM system may be configured to retrieve one or more versions and interpret the one or more versions. The EIM system may be configured to interpret and/or display the one or more versions using the metadata recorded with a respective version selected by the user (e.g., this may ensure that the versioned information is displayed in a semantically and subjectively similar way to how it would have been visible to users at the point in time the version was created).

In some embodiments, the EIM system may be configured to insulate the data against changes to business logic and visual changes in the user interface, which may impact the subjective interpretation of the data.

In some embodiments, a user, using the EIM system, may select a period of interest. The user may navigate to an object of interest corresponding to the selected period of interest. The EIM system may be configured to access a versions database. The versions database may include any suitable database, such as those described herein or any other suitable database. The EIM system may be configured to store created (e.g., or generated) versions in the versions database.

The EIM system may retrieve from the versions database a version that includes one or more smart objects or other data corresponding with the object of interest selected by user, for the selected period. The EIM system may be configured to determine whether the version of object of interest was active during the selected period based on the retrieved more smart objects or other data corresponding with the object of interest from the versions database. If the EIM system determines the version was not active during the selected period, the EIM system discards the retrieved version. Alternatively, if the EIM system determines the version of the object of interest was active during the selected period, the EIM system displays the version of the object of interest.

In some embodiments, the EIM system may be configured to identify permissions of users associated with the version of the object of interest, in response to a determination that the object of interest was active during the selected period. For example, the EIM system may be configured to access the versions database, or other suitable database, to identify access permissions corresponding to users associated with the object of interest. The EIM system may be configured to reconcile the permissions against a current set of permissions. The EIM system may annotate records associated with the object of interest using the reconciled permissions.

In some embodiments, the EIM system may be configured to receive a selected version of raw data stored in the database. The EIM system may apply ontological metadata to the selected raw data. For example, the EIM system may retrieve the metadata from the versions database or other suitable database. The EIM system may apply subjective metadata to the records associated with the object of interest. The EIM system may render a visual data structure associated with the raw data using the raw data and the metadata. The EIM system may display the rendered visual data structure.

Typically, enterprise information management office functions that support governance, operations, reporting, and compliance have relied on email, manual processes, generic calendar applications, spreadsheets, and various combinations thereof, which has created a technology void for enterprise information management offices, and in particular, to family office functions. This technology void has resulted in slow, inefficient, and sometimes, inaccurate or incomplete work product. Accordingly, a system that is configured to close this technology gap and improve efficiency, speed, accuracy, and other aspects of an enterprise information management office, such as the enterprise information management system 1000, as is generally illustrated in FIG. 1, may be advantageous.

FIG. 1 is a block diagram of an example of an enterprise information management system ("EIM" system) 1000 in accordance with this disclosure. The EIM system 1000 may include an electronic computing and communications system. As used herein, the term electronic computing and communications system, and EIM system, or variations thereof, can be, or include, a distributed computing system (e.g., a client-server computing system), a cloud computing system, a clustered computing system, or the like.

The system 1000 can include one or more users 1002. A user 1002 may include a professional performing one or more operations or functions in support of an enterprise information management office that utilizes the system 1000. For example, a user 1002 may include an estate planning attorney performing estate planning functions of a family office using the system 1000. The user 1002 can include one or more clients. For example, and without limitation, the user 1002 can include a client 1004. The client 1004 can comprise a computing system, which can include one or more computing devices, such as a mobile phone, a tablet computer, a laptop computer, a notebook computer, a desktop computer, or any other suitable computing device or combination of computing devices. In some implementations, the client 1004 can be implemented as a single physical unit or a combination of physical units. In some implementations, a single physical unit can include multiple clients.

In some implementations, the client 1004 can be an instance of an application running on a user device associated with the user 1002. As used herein, the term "application" can include, but is not limited to, applications, programs, instances, processes, threads, services, plugins, patches, application version upgrades, or any other identifiable computing unit. The system 1000 can include any number of users or clients or can have a configuration of users or clients different from that generally illustrated in FIG. 1. For example, and without limitation, the system 1000 can include hundreds or thousands of users and at least some of the users can include or be associated with any number of clients. A user can include a user network or domain. For example, and without limitation, the client 1004 can be associated or communicate with a user network or domain.

The system 1000 can include a datacenter 1008. The datacenter 1008 can include one or more servers. For example, and without limitation, the datacenter 1008, as generally illustrated, includes an application server 1012 and a database server 1016. A datacenter, such as the datacenter 1008, can represent a geographic location, which can include a facility, where the one or more servers are located. The system 1000 can include any number of datacenters and servers or can include a configuration of datacenters and servers different from that generally illustrated in FIG. 1. For example, and without limitation, the system 1000 can include tens of datacenters, and at least some of the datacenters can include hundreds or any suitable number of servers. In some implementations, the datacenter 1008 can be associated or communicate with one or more datacenter networks or domains, which can include domains other than the client domain.

In some implementations, the client 1004 and the servers associated with the datacenter 1008 are configured to connect to, or communicate via, a network 1006. In some implementations, a client 1004 associated with the user 1002 can connect to the network 1006 via a communal connection point, link, or path. In some implementations, a client 1004 associated with the user 1002 can connect to, or communicate via, the network 1006 using a distinct connection point, link, or path. A connection point, link, or path can be wired, wireless, use other communications technologies, or a combination thereof.

In some implementations, the network 1006 can include, for example, the Internet. In some implementations, the network 1006 can be, or include, a local area network (LAN), a wide area network (WAN), a virtual private network (VPN), or any other public or private means of electronic computer communication capable of transferring data between a client, such as the client 1004, and one or more servers associated with the datacenter 1008, or a combination thereof. The network 1006, the datacenter 1008, or any other element, or combination of elements, of the system 1000 can include network hardware such as routers, switches, load balancers, other network devices, or combinations thereof. For example, the datacenter 1008 can include a load balancer 1010 for routing traffic from the network 1006 to various servers associated with the datacenter 1008.

The load balancer 1010 can route, or direct, computing communication traffic, such as signals or messages, to respective elements of the datacenter 1008. For example, the load balancer 1010 can operate as a proxy, or reverse proxy, for a service, such as an Internet-delivered service, provided by the datacenter 1008 to one or more remote clients, such as the client 1004, via the network 1006. Routing functions of the load balancer 1010 can be configured directly or via a Domain Name System (DNS). The load balancer 1010 can coordinate requests from remote clients, such as the client 1004, and can simplify client access by masking the internal configuration of the datacenter 1008 from the remote clients. Request coordination can include maintaining information for sessions, such as sticking sessions, between a client and a service or application provided by the datacenter 1008.

A load balancer 1010 can operate as a firewall, allowing or preventing communications based on configuration settings. Although the load balancer 1010 is depicted in FIG. 1 as being within the datacenter 1008, in some implementations, the load balancer 1010 can instead be located outside of the datacenter 1008, for example, when providing global routing for multiple datacenters. In some implementations, load balancers can be included both within and outside of the datacenter 1008.

In some implementations, the datacenter 1008 includes an application server 1012 and a database server 1016. The application server 1012 or the database server 1016 can be a computing system, which can include one or more computing devices, such as a desktop computer, a server computer, or any other computer capable of operating as a server. In some implementations, the application server 1012 or the database server 1016 can be non-hardware servers implemented on a physical device, such as a hardware server. In some implementations, the application server 1012 and the database server 1016 can be implemented as a single hardware server or as a single non-hardware server implemented on a single hardware server. In some implementations, any number of application servers or database servers can be implemented at the datacenter 1008. In some implementations, the datacenter 1008 can include servers other than or in addition to the application server 1012 or the database server 1016, for example, a web server.

In some implementations, the application server 1012 includes an application node 1014, which can be a process executed on the application server 1012. For example, and without limitation, the application node 1014 can be executed in order to deliver services to a client, such as the client 1004, as part of a web application. The application node 1014 can be implemented using processing threads, virtual machine instantiations, or other computing features of the application server 1012. In some implementations, the application node 1014 can store, evaluate, or retrieve data from a database, such as the database 1018 of the database server 1016.

In some implementations, the application server 1012 can include any suitable number of application nodes, depending upon a system load or other characteristics associated with the application server 1012. For example, and without limitation, the application server 1012 can include two or more nodes forming a node cluster. In some implementations, the application nodes implemented on a single application server 1012 can run on different hardware servers.

The database server 1016 can be configured to store, manage, or otherwise provide data for delivering services to the client 1004 over a network. In some implementations, the database server 1016 includes a data storage unit, such as a database 1018, which can be accessible by an application executed on the application node 1014. In some implementations, the database 1018 can be implemented as a relational database management system (RDBMS), an object database, an XML database, a management information base (MIB), one or more flat files, other suitable non-transient storage mechanisms, or a combination thereof. While limited examples are described, the database 1018 can be configured as or comprise any suitable database type. Further, the system 1000 can include one, two, three, or any suitable number of databases configured as or comprising any suitable database type or combination thereof.

In some implementations, one or more databases (e.g., the database 1018), tables, other suitable information sources, or portions or combinations thereof can be stored, managed, or otherwise provided by one or more of the elements of the system 1000 other than the database server 1016, such as the client 1004 or the application server 1012.

Some or all of the systems and methods described herein can operate or be executed on or by the servers associated with the system 1000. For example, an update for an application executed on the application node 1014 can include updating or upgrading the database 1018. In some implementations, the systems and methods described herein, portions thereof, or combinations thereof can be implemented on a single device, such as a single server, or a combination of devices, for example, a combination of the client 1004, the application server 1012, and the database server 1016.

In some implementations, the system 1000 can include devices other than the client 1004, the load balancer 1010, the application server 1012, and the database server 1016 as generally illustrated in FIG. 1. In some implementations, one or more additional servers can operate as an electronic computing and communications system infrastructure control, from which servers, clients, or both servers and clients, can be monitored, controlled, configured, or a combination thereof.

In some implementations, the network 1006, one or more datacenters, such as the datacenter 1008, and one or more load balancers, such as the load balancer 1010, can be implemented within a distributed computing system. In some implementations, a load balancer associated with a distributed computing system (e.g., the load balancer 1010) can communicate with the network 1006, one or more datacenters (e.g., the datacenter 1008), other load balancers, or a combination thereof. In some implementations, the load balancer 1010 can be configured to route communications to a primary datacenter, identify a failover condition (e.g., such as an enumerated failover condition) at the primary datacenter, and redirect communications to a secondary datacenter until the failover condition is resolved. Although illustrated as a single unit in FIG. 1, a load balancer 1010 can be implemented as multiple physical or logical units. For example, a distributed computing system can include distinct routing units, load balancing units, firewall units, or the like.

The primary datacenter can include a primary database, such as the database 1018, and the secondary datacenter can include a secondary database. In some implementations, the secondary database can include an exact or substantially exact mirror, copy, or replication of the primary database. In some implementations, the primary database or the secondary database can be implemented as a relational database management system (RDBMS), an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a service or application to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

Figure 2:
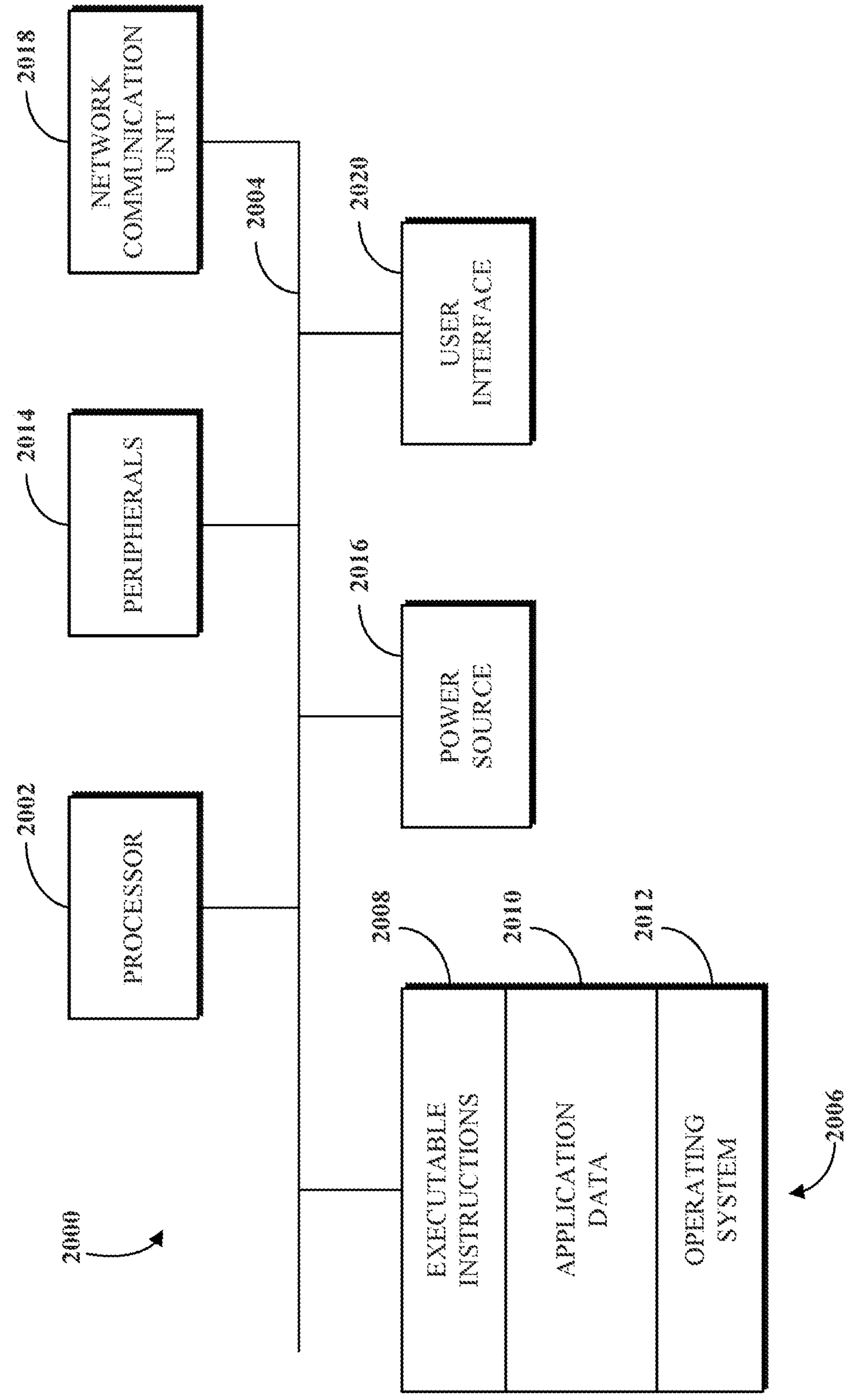
FIG. 2 is a block diagram of an example internal configuration of a computing device of the electronic computing and communication system shown in FIG. 1.

FIG. 2 generally illustrates a block diagram of an example internal configuration of a computing device 2000, such as a client 1004 or a server, such as an application server 1012 or a database server 1016, of the system 1000 as generally illustrated in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 2000 can include components or units, such as a processor 2002, a bus 2004, a memory 2006, peripherals 2014, a power source 2016, a network communication unit 2018, a user interface 2020, other suitable components, or a combination thereof.

The processor 2002 can be a central processing unit (CPU), such as a microprocessor, and can include single or multiple processors having single or multiple processing cores. Alternatively, the processor 2002 can include another type of device, or multiple devices, now-existing or hereafter developed, capable of manipulating or processing information. For example, the processor 2002 can include multiple processors interconnected in any manner, including hardwired or networked, including wirelessly networked. In some implementations, the operations of the processor 2002 can be distributed across multiple physical devices or units that can be coupled directly or across a local area or other suitable type of network. In some implementations, the processor 2002 can include a cache, or cache memory, for local storage of operating data or instructions.

In some implementations, the memory 2006 can include volatile memory, non-volatile memory, or a combination thereof. For example, the memory 2006 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. In some implementations, the memory 2006 can include another type of device, or multiple devices, now-existing or hereafter developed, capable of storing data or instructions for processing by the processor 2002. The processor 2002 can access or manipulate data in the memory 2006 via the bus 2004. Although shown as a single block in FIG. 2, the memory 2006 can be implemented as multiple units. For example, a computing device 2000 can include volatile memory, such as RAM, and persistent memory, such as a hard drive or other storage. Although depicted here as a single bus, the bus 2004 can be composed of multiple buses, which can be connected to one another through various bridges, controllers, or adapters.

The memory 2006 can include executable instructions 2008, data, such as application data 2010, an operating system 2012, or a combination thereof, for immediate access by the processor 2002. The executable instructions 2008 can include, for example, one or more application programs, which can be loaded or copied, in whole or in part, from non-volatile memory to volatile memory to be executed by the processor 2002. The executable instructions 2008 can be organized into programmable modules or algorithms, functional programs, codes, code segments, or combinations thereof to perform various functions described herein. For example, the executable instructions 2008 can include instructions to provide enterprise information management, as described above. The application data 2010 can include, for example, user files, database catalogs or dictionaries, configuration information or functional programs, such as a web browser, a web server, a database server, or a combination thereof. The operating system 2012 can be, for example, Microsoft Windows®, Mac OS X®, or Linux®; or an operating system for a small device, such as a smartphone or tablet device; or an operating system for a large device, such as a mainframe computer. The memory 2006 can comprise one or more devices and can utilize one or more types of storage, such as solid state or magnetic storage. The memory 2006 can be distributed across multiple clients or servers, such as network-based memory or memory in multiple clients or servers performing the operations of clients or servers.

The peripherals 2014 can be coupled to the processor 2002 via the bus 2004. The peripherals can be sensors or detectors, or devices containing any number of sensors or detectors, which can monitor the computing device 2000 itself or the environment around the computing device 2000. For example, a computing device 2000 can contain a geospatial location identification unit, such as a global positioning system (GPS) location unit. As another example, a computing device 2000 can contain a temperature sensor for measuring temperatures of components of the computing device 2000, such as the processor 2002. Other sensors or detectors can be used with the computing device 2000, as can be contemplated. In some implementations, the power source 2016 can be a battery, and the computing device 2000 can operate independently of an external power distribution system. Any of the components of the computing device 2000, such as the peripherals 2014 or the power source 2016, can communicate with the processor 2002 via the bus 2004. In some implementations, a client or server can omit the peripherals 2014. The operations of the processor 2002 can be distributed across multiple clients or servers, which can be coupled directly or across a local area or other suitable type of network.

The network communication unit 2018 can also be coupled to the processor 2002 via the bus 2004. In some implementations, the network communication unit 2018 can comprise one or more transceivers. The network communication unit 2018 can, for example, provide a connection or link to a network, such as the network 1006, via a network interface, which can be a wired network interface, such as Ethernet, or a wireless network interface. For example, the computing device 2000 can communicate with other devices via the network communication unit 2018 and the network interface using one or more network protocols, such as Ethernet, TCP, IP, power line communication (PLC), WiFi, infrared, GPRS, GSM, CDMA, or other suitable protocols.

A user interface 2020 can include a display; a positional input device, such as a mouse, touchpad, touchscreen, or the like; a keyboard; or other suitable human or machine interface devices. The user interface 2020 can be coupled to the processor 2002 via the bus 2004. Other interface devices that permit a user to program or otherwise use the computing device 2000 can be provided in addition to or as an alternative to a display. In some implementations, the user interface 2020 can include a display, which can be a liquid crystal display (LCD), a cathode-ray tube (CRT), a light emitting diode (LED) display (e.g., an OLED display), or other suitable display.

As described, an application node, such as the application node 1014 can be executed to deliver services to the user 1002, the client 1004, the components of the datacenter 1008, or a combination thereof. In some implementations, the application node 1014 is configured to perform, when executed by a processor, such as the processor 2002, an enterprise information management application ("EIM application").

In some embodiments, the EIM application may be configured to generate hierarchical data structures on information received from a user of the EIM system 1000. The EIM application may be executed on a server computing device, such as a server instance of the computing device 2000. The hierarchical data structures represent enterprise information corresponding to various assets and liabilities of an organization utilizing the EIM system 1000. A hierarchical data structure may include one or more collection data objects. A collection data object may represent physical "real-world" information about an asset or liability. For example, the user of the EIM system 1000 may include a knowledge worker, such as attorney, accountant, property manager, asset manager, administrative assistant, an organizational member (e.g., in the case of a family office, an organizational member may include a family member), or other suitable knowledge worker. The user may have special knowledge of a particular asset or liability. For example, the user may be a real-estate attorney having special knowledge of a property asset, including the physical location and size of the property, the value of the property, tax implications of owning the property, other information, or a combination thereof.

The user may input the information using the user interface 2020, as described. The EIM application generates a first collection data object using the information provided by the user. The first collection data object represents the information of the property.

The hierarchical data structure may mimic how professionals operating within the enterprise information management office think, plan, and/or oversee the organization's assets and/or liabilities. In some embodiments, each collection data object is a separate control environment that allows its operations to be customized to meet its specific needs.

Figure 3:
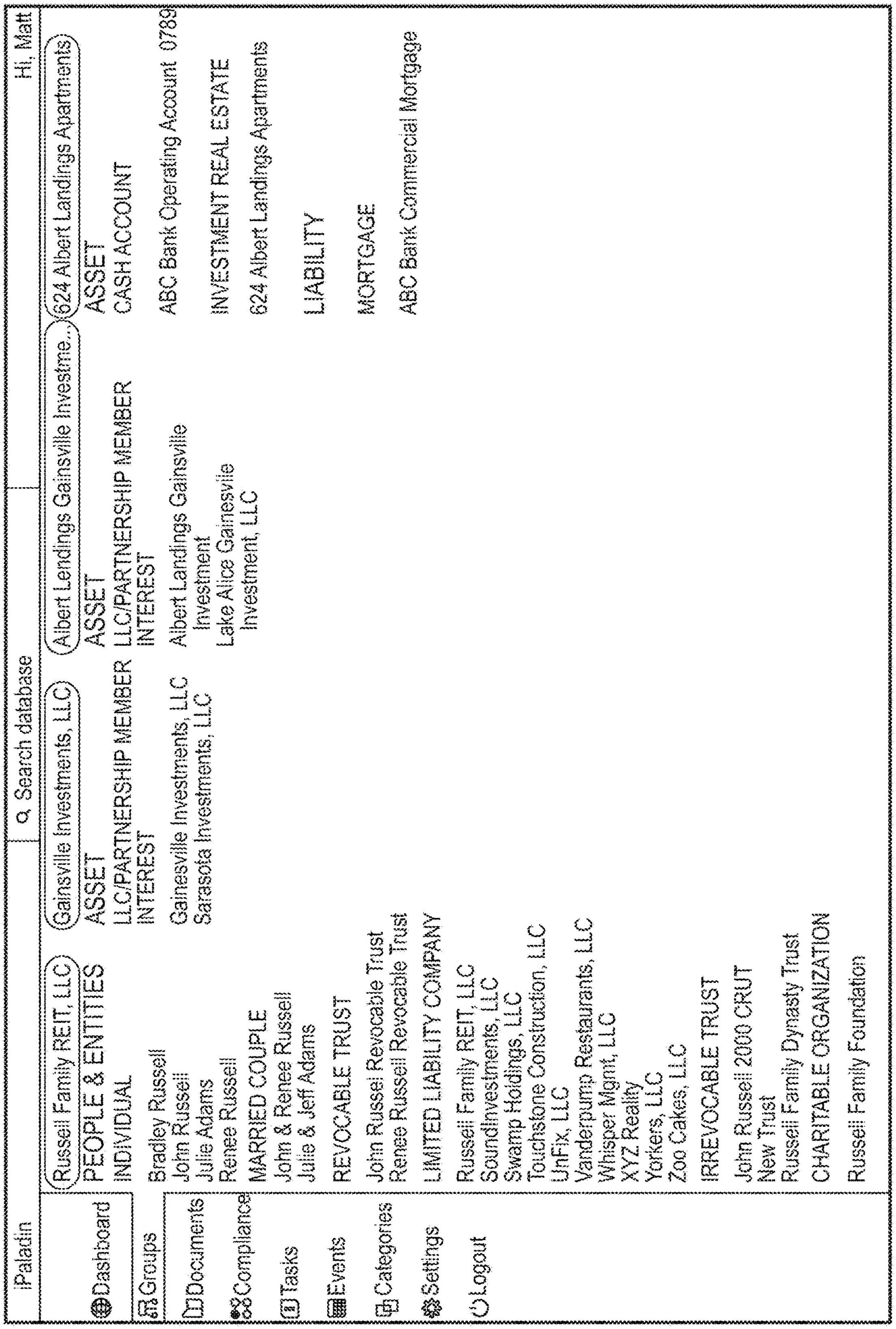
FIG. 3 generally illustrates an output interface according to the principles of the present disclosure.

With reference to FIG. 3, an output interface 100 associated with the EIM system 1000 generally illustrates various information associated used to generate corresponding collection data objects. In some embodiments, the output interface 100 may be displayed on a client computing device, such as a client instance of the computing device 2000. A two-tiered typing system may be configured to order the collection data objects based on the subject matter type and/or ownership of the real-world asset and/or liability represented by a respective collection data object. This may provide a significant improvement over the use of simple electronic folder structures that provide a one-way linear organization and limit ordering to folder name, date added, etc. The two-tiered system for organizing collection data objects may allow related assets to be grouped together at the top of the hierarchy. For example, in the case of a family office, the two-tiered system of organizing collection data objects may allow collection data objects representing revocable trusts to be grouped together.

In the example generally illustrated in FIG. 3, a top of the hierarchal data structure may represent higher levels of owner and/or settlor control above lessor levels of owner and/or settlor control. For example, in the case of a family office, LLCs, partnerships, and corporations associated with the family may be organized and displayed at or near the top of the output interface 100. Conversely, irrevocable trusts associated with the family may be organized below the LLCs, partnerships, and corporations associated with the family because the settlor of an irrevocable trust has relinquished control through completed gift or transfer of asset relative to assets contributed into LLCs, partnerships, and corporations associated with the family. Further, irrevocable trusts may be organized by grantor and non-grantor attributes associated with the irrevocable trusts. Additionally, or alternatively, charitable organizations associated with the family may appear at or near the bottom of the output interface 100.

The output interface 100 may include a first column and a second column. The first column may display all people and entities associated with the organization's assets and/or liabilities. The second column may display asset and liability collection data objects. In some embodiments, the output interface 100 may include additional or fewer columns than illustrated in FIG. 3.

For example, the output interface 100 may include a fourth column that may display assets and liabilities collection data objects ordered or organized from liquid to illiquid assets as they would appear on a financial statement (e.g., with assets and cash near the top of the statement, followed by real-estate, and then liabilities near the bottom of the statement), with each asset and liability collection located under respective individual owners, joint owners, and/or entities. Further, the collection data objects may be organized in the fourth column using any suitable organization.

Collection data objects that represent assets and liabilities held individually (e.g., by a single member of the organization) are placed under respective organizational member identifiers in the output interface 100. This may allow users viewing the output interface 100 to quickly assess a scope of taxable estates and/or potential liability coverage needs of the organization. Similarly, collection data objects representing assets and/or liabilities that are held jointly by more than one member of the organization (e.g., having joint ownership), such as, a married couple, tenants in common, or other joint ownership, are distinguished on the output interface 100 by type as an untimely death of one of the join owners could result in an unintended inheritance by survivorship or an asset interest passing through probate or other legal function.

The EIM system 1000 and the EIM application provide visibility and issue spotting of assets and liabilities associated with the organization using the hierarchical data structure, described, that is typically only available using manually produced diagrams, spreadsheets, and/or in separate mind mapping type applications. The EIM system 1000 and the EIM application are configured to collectively manage and report on these complex visibility and issue spotting requirements in a simple to review output interface, such as the output interface 100. It should be understood that information displayed in the respective columns described above may be displayed in columns other than is indicated herein.

The respective collection data objects may be dynamically updated and/or configured by the EIM application. For example, as users of the EIM application operate to manage the enterprise information of the organization, the users may provide updated information associated with respective collection data objects. The EIM application is configured to update respective collection data objects based on the updated information. This may allow users to continuously reflect, via the collection data objects, current subject matter and/or ownership of the real-world assets or liabilities represented by respective collection data objects, and display the current state of the real-world assets or liabilities dynamically on the output interface 100. For example, as an asset or liability is sold or disposed of, its respective collection data object can be marked inactive on the output interface 100 based on information the user provides to the EIM application.

Inactive collection data objects remain in a menu bar associated with the output interface 100 but appear in a sub-list below active collection data objects on the output interface 100. In some embodiments, contents and/or information associated with inactive collection data objects remain accessible by users of the EIM system 1000 for reference to without having to wait for physical files pertaining to the inactive asset or liability represented by the inactive collection data object to delivered from storage or for archived files to be made available. For example, a user may interact with various menus, dropdown lists, and/or buttons on the output interface 100 in order to review active and/or inactive collection data objects. In some embodiments, collection data objects can be relocated within the hierarchical data structure. For example, if first organizational member transfers an asset owned by the first organizational member to a second organizational member, a user can provide the change in ownership to the EIM application. The EIM application may then update the respective collection data object representing the asset to reflect the ownership change.

Collection data objects may be "stacked" on the output interface 100 to reflect ownership. For example, in the case of a family office, an irrevocable trust that wholly owns two Regional LLC's, each of which hold 2 local LLC's, each of which hold a cash account, parcel of real estate, and a commercial mortgage requires 19 collection data objects is generally illustrated on the output interface 100. Accordingly, the EIM system 1000 and the EIM application do not impose a limit on collection data object stacking as is generally illustrated in FIG. 3.

Figure 4:
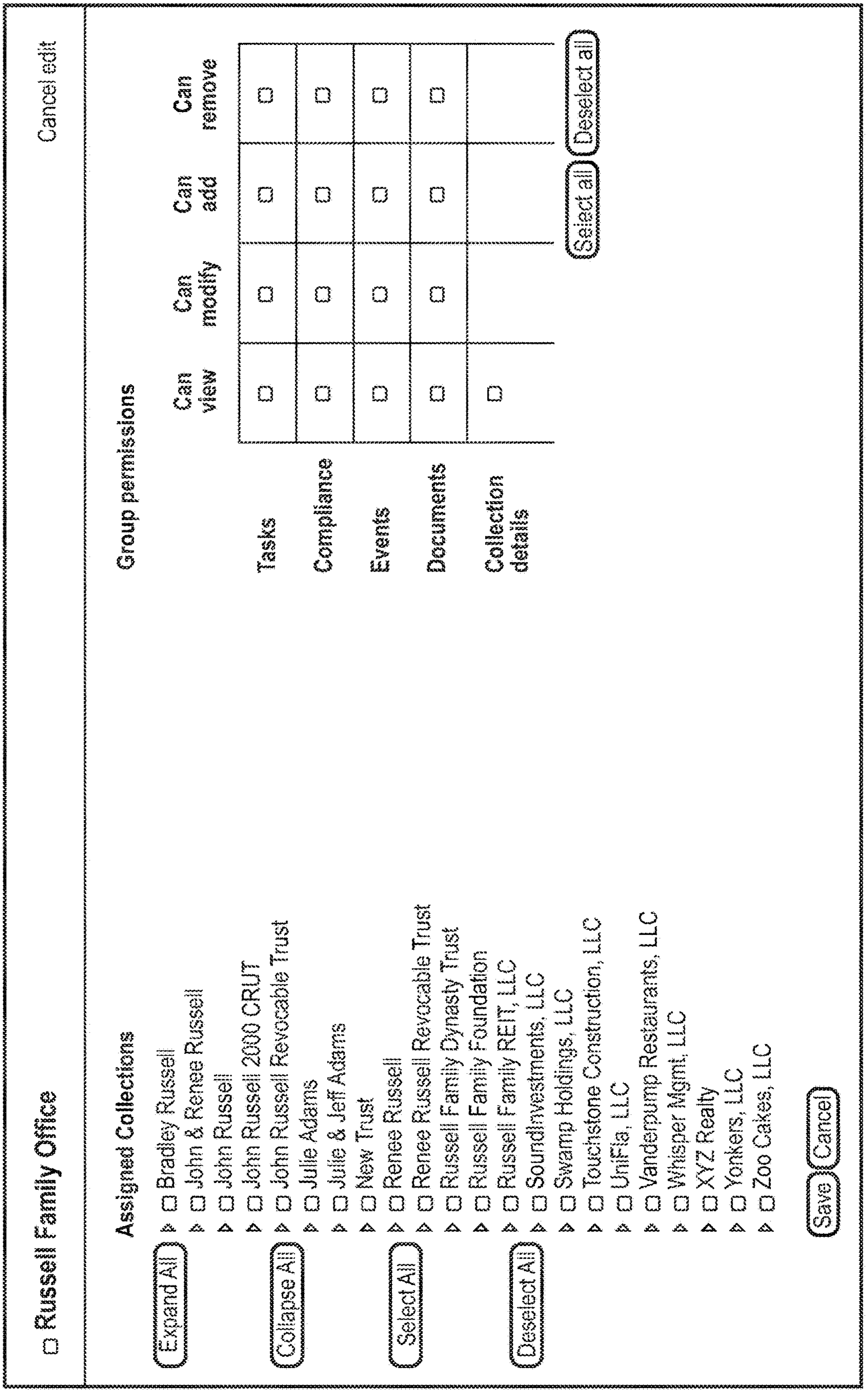
FIG. 4 generally illustrates a user control page according to the principles of the present disclosure.

FIG. 4 generally illustrates a user control interface 200. The user control interface 200 provide an interface for assigning access to collection data objects by selecting (by a user) a box on a first side of the user control interface 200. In some embodiments, the first side of the user control interface 200 may be on the left side of the user control interface 200. The user control interface 200 may provide an interface for setting permissions to conduct activity separately for individual smart data objects, as will be described, on a second side of the user control interface 200. In some embodiments, the second side of the user control interface 200 may be on the right side of the user control interface 200.

The EIM application is configured to provide governance to each respective collection data object. For example, the EIM application may include contact information stored in a contact table within a database, such as the database 1018. The contact information may include contact name, information related to the position of the contact within the organization, a contact role, contact permissions, access rights (e.g., information indicating what type of data objects and/or what time of information associated with the data objects the user associated with the contact information has rights to access, as will be explained), other suitable contact information, or a combination thereof. The contact information may be populated and/or stored in the contact table by a user of the EIM system 1000 and/or imported from other suitable systems, such as, an email system. In some embodiments, contact information may include contact information for a business, trust, philanthropic organization, or other group or organization. Further, a user may include an individual user or a business, organization, philanthropic organization, or other group of individuals.

As described, the user may select one or more contacts to associate with a respective collection data object. The EIM application receives the user selection and associates the one or more selected contacts with the respective collection data object. In some embodiments, the EIM application generates an output or output information, such as using the output interface 100, that illustrates information associated with one or collection data objects based on contact information associated with a user attempting to access the information associated with the one or more collection data objects. For example, a user may attempt to view, via the output interface 100, information associated with one or more collection data objects that user is associated with. The EIM application may identify a contact in the contact table that corresponds to the user. The EIM application may generate the output based on the contact information associated with the user. For example, in the case of a family office, the contact information for a user may indicate that the user is a family member. The family member may be associated with one or more collection data objects that represent one or more corresponding assets owned or partially owned by the user.

The EIM application generates an output that includes the collection data objects associated with the user. By allowing access to collection data objects and associated smart data objects based on the contact information, a user with limited access relative to the entire organization can locate and operate within collection data objects and smart data objects using the appropriate requisite permissions (e.g., determined based on their contact information) in order to complete the duties of the role in an independent and autonomous fashion. That is, a limited user can access what is required of the limited user's role without violated security and permissions of the data objects. This allows for independent work by lower level users while maintaining all documents and items regardless of specific permissions in one system.

In some embodiments, the EIM application may configure the information included in the output based on the user contact information. For example, in the case of a family office, when the user contact information indicates that the user is a family member, the EIM application includes in the output information about the ownership of an asset and/or liability associated with a collection data object, various reports associated with an asset and/or liability associated with a collection data object, other suitable information, or a combination thereof. In this case, the output may include a subset of all information associated with the collection data objects being displayed. In another example, the user contact information may indicate that the use is a trustee responsible for the one or more collection data objects. The EIM application may include in the output upcoming action items, tasks, meetings, reports, ownership information, other suitable information, or a combination thereof. That is, the EIM application may restrict, limit, expand, or otherwise configure information included in the output corresponding to the one or more collection data objects based on the user contact information. For example, the EIM application may include in the output a subset of all information associated with the collection data objects or all information associated with the collection data objects. This allows for information to be kept private and controlled, such that, only authorized users can see and/or interact with information corresponding to their authorization (e.g., contact information).

In some embodiments, the user control interface 200 may include a collections details panel. The collections details panel may include information associated with a collection data object. For example, the collections details panel may include social security numbers associated with one or more users associated with a collection data object, one or more account numbers associated with a collection data object, funds transfer instructions (e.g., such as money wiring instructions) associated with a collection data object, other suitable information, and/or a combination thereof. As described, user contact information indicates a level of privacy and confidentiality associated with for each user allowing access into collection data objects based on their need to know and participation basis. By restricting users, activity, and/or information at the boundary line of each collection data object, common privacy violations are prevented. For example, common privacy violations, such as inadvertently selecting the wrong auto-populated recipient in an email and/or curious staff browsing through paper or server files may be prevented. The EIM application is configured to restrict permitted collection data object users to only communicating and sharing information with other permitted collection data object users. Administrative rights are required to add user contact information, change user contact information permissions, and to remove a user contact access.

Figure 5:
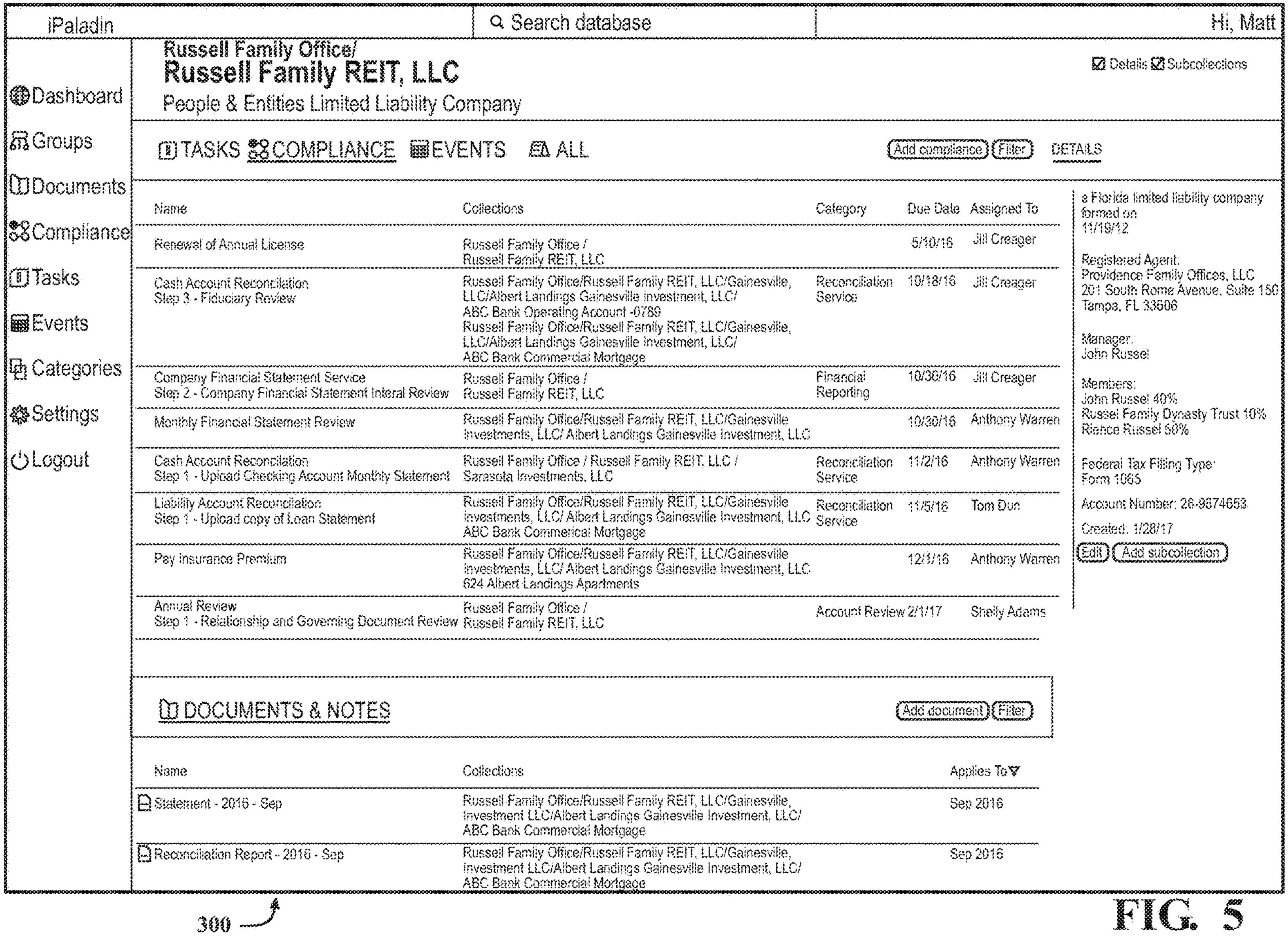
FIG. 5 generally illustrates a collection dashboard according to the principles of the present disclosure.

FIG. 5 generally illustrates a collection data object dashboard 300 of with the EIM system 1000. In some embodiments, the collection data object dashboard 300 may provide improved visibility and access to information associated with the collection data objects than is typically possible using other systems. The collection data object dashboard 300 displays all users, activity and information in a meaningful format. The collection data object dashboard 300 contains a details panel, an activity section with separate tabs listing compliance services being rendered, tasks as a record for day-to-day functions and operations, events for upcoming meetings, other suitable information, or a combination thereof. A separate section on the collection data object dashboard 300 may include a document library. In some embodiments, for each collection data object, users can communicate create and/or store documents, conduct administrative activity relating to day-to-day tasks, record professional services rendered, complete recurring compliance responsibilities, and/or document meetings and events using smart data objects, as will be described.

The collection data object dashboard 300 may be configured to display pending activity associated with one or more collection data objects. Filters for each activity type allow users to locate: their completed work, all completed tasks, compliance and meetings by user, and/or date or service category. The document library list defaults to display, by the EIM application on the output interface 100, ordering a last in document at or near the top of the collection data object dashboard 300. This allows users to quickly scan the top of the document library section for recently received information. A document filter is also available to quickly navigate to any document by category or date.

The detail panel may include and/or display information that necessitates increased security control and therefore requires permission for rights to view. As described, the EIM application is configured to display on the details panel information to a user based on the user's contact information. The details panel may include three, or more or less, tabs. The first tab provides a section where users can include short descriptions about a person, entity, asset, or liability that the collection data object is associated with. Information such as legal name, legal situs, formation (birth) date, name and legal capacity of decision makers, stakeholders, agents and their contact information, tax identification numbers, tax filing requirements, etc. is all critical to the governance of the collection data object. This information must be aggregated from multiple sources. For example, the various information described may be stored in one or more tables on one or more databases. Further, the databases may be stored on one or more servers, as described. In some embodiments, the information may be stored in a single database using multiple tables. The information may be linked as related between the multiple tables.

A second tab displays a list of users who have access to participate in and/or view information associated with the collection data object. The third tab lists all activity within the collection data object. The third tab is configured to display, by user, all activity, information stored and shared with respect to the collection data object such that a factual digital record is automatically captured eliminating the need for fiduciary recordkeeping as a separate manual task. Additionally, or alternatively, the collection details panel allows a new sub-collection data object to be added below the collection dashboard panel being viewed. The sub-collection data object may represent an asset or liability that is associated with the collection data object and is hierarchically below the collection data object. For example, the collection data object may represent an LLC and the sub-collection data object may represent an asset owned by the LLC. In some embodiments, the collection data object details panel includes a collection title, type, and location. The collection title, type, and location may be updated (e.g., changed or marked as inactive, for example) by a user. In some embodiments, the EIM application is configured to generate an annually recurring compliance responsibility for each collection data object generated by the EIM application. As is generally illustrated in FIG. 5, the annually recurring compliance responsibility is automatically imposed and has an initial due date 10 days after the collection data object is generated to insure annual collection data object reviews. While the due date can be amended, the default imposition of the compliance responsibility is a system fail safe preventing new matters from being neglected.

After the hierarchy data structure is established, users may utilize information on their desk and/or focus on defining and applying the collection data object's required governance, operations, compliance, and reporting responsibilities. In some embodiments, a secured details panel provides a notes section where users can indicate the collection data object's business purpose, tax filing status, account numbers, and personal preferences of owners and beneficiaries, and so on. In some embodiments, a compliance section allows all recurring responsibilities to be digitally generated using the EIM application's default compliance templates.

In some embodiments, the EIM application may track day-to-day operations with task and event features of the collection data object dashboard 300. All required documents are uploaded into the document library. Users communicate with one another in context of any compliance, task, event, or document. As work is completed, the collection data object's activity is captured to produce a fiduciary record to defend against legal and tax challenges and to inform successors with quick transparent visibility into where the predecessor work ended and their work may begin. The EIM application's compliance prompts professionals to conduct an annual review of each collection data object to insure sufficiency of its operational plan. The collection data object dashboard 300 may display a comprehensive view all activity and information of each separate collection data object.

In some embodiments, the EIM application is configured to generate smart data objects based on input information received from a user. Smart data objects may represent information associated with tasks, compliance, events, documents, other suitable information, or a combination thereof. For example, a user may input information associated with a meeting between the user and another user associated with the collection data object. The EIM application generates a smart data object using the information to represent the meeting. The smart data object is hierarchically below the collection data object, such that, the smart data object may inherit attributes of the collection data object. For example, a user having access to the collection data object may also have access to the smart data object. By removing the need to specify access and permissions at the smart data object level (e.g., because the smart data objects inherit access and permissions from the corresponding collection data objects), users generating the smart data objects save value time and limit potential mistakes by allowing inappropriate access and permissions to be set at a smart data object level. This is especially beneficial to large organizations utilizing the enterprise information management office. Further, the user has more control over changing access and permissions for an entire hierarchical structure (e.g., a collection data object and its associated smart data objects) by changing access and permissions at the collection data object level. In some embodiments, the attributes of the smart data object may be selectively modified by a user. For example, the user providing the information used to generate the smart data object may specify a list of users, using corresponding contact information, that can view and/or interact with the smart data object. The list of users may be a subset or different from the list of users that can view and/or interact with the collection data object. As described, the EIM application may generate an output of information associated with one or more collection data objects based on the contact information of a user attempting to access the one or more collection data objects. Similarly, the EIM application generates output of the information associated with smart data objects associated with the one or more collection data objects based on the user contact information. As described, the output information may include a subset of all information associated with the smart data objects or all information associated with the smart data objects based on the user contact information (e.g., access rights indicated by the contact information as described).

In some embodiments, the EIM application stores a relationship and/or relationship information between a collection data object and associated smart data objects in a data object relationship table of a database, such as the database 1018. For example, the EIM application may store in the relationship table information indicating that a first collection data object is associated with a first smart data object and a second smart data object. Further, the EIM application may store in the relationship table information indicating that the first data object is associated with the first collection data object and that a third smart data object is associated with the first smart data object (e.g., the third smart data object is a smart data object that is hierarchically lower than the first smart data object). Additionally, or alternatively, the EIM application may store other suitable information in the relationship table than that described herein.

Smart data objects represent various suitable types of activities and information storage needed by the enterprise information management office to effectively conduct operations, reporting, compliance, other suitable functions, or a combination thereof of the organization using the enterprise information management office.

In some embodiments, the EIM application does not provide system defaults granting users permissions to view, add, modify, or remove the smart data objects. For example, each user's permissions must be specifically granted when the smart data object is generated. For example, the user providing the information that the EIM application uses to generate the smart data object may include with the information contact information for users permitted to view, add, modify, or remove the smart data object. This allows granular levels of security control over activity and information represented by the smart data object allowing each user to work as indicated by the contact information associated with the user without compromising privacy and/or security. For example, a clerk can file documents in collection data objects using a smart data object without viewing the specific strategic activity and information reflected in the collection data object's other smart data objects. Additionally, or alternatively, a user may be restricted to adding a document, while not being permitted to view any other documents.

In some embodiments, a user may use various templates that guide the user through the various data rules associated with smart data objects in order to provide appropriate information to the EIM application to generate respective smart data objects. Every smart data object assigned to at least one collection data object by the EIM application based on the information received from the user. Once initially assigned, a smart data object may also be assigned, by the EIM application using the information received from the user, to other collection data objects. The user selects, from the input interface, a smart data object category and date. The selections govern storage of the smart data object within the collection data object, which in turn governs security.

In some embodiments, a smart data object may be initiated from a user dashboard, a document tab, a task tab, a compliance tab, an event tab, or other suitable tab. A smart data object can be added to any collection data object that the user has access and permission within the hierarchical data structure. For example, when the smart data object is initiated from a specific collection data object dashboard, such as the collection data object dashboard 300, any features allowing smart data objects to be added only permit the user to assign to a collection data object being viewed, which is auto-selected in the template. From the details page of any smart data object, any attempts to link another smart data object are limited to the smart data objects assigned to the collection data object of the original smart data object which is auto-selected for the user.

Smart data objects may be assigned to collection data objects and/or other smart data objects, as described, and/or linked to other smart data objects. The EIM application uses a set of rules that govern the assignment and linking of a smart data object to another smart data object. This assignment and linking is required to facilitate asset and/or liability transfers or common activity between collection data objects. There is no limit to the number of collection data objects smart data object can be assigned or linked to. However, access to view smart data objects are still governed by collection data objects associated with the smart data object.

Figure 6:
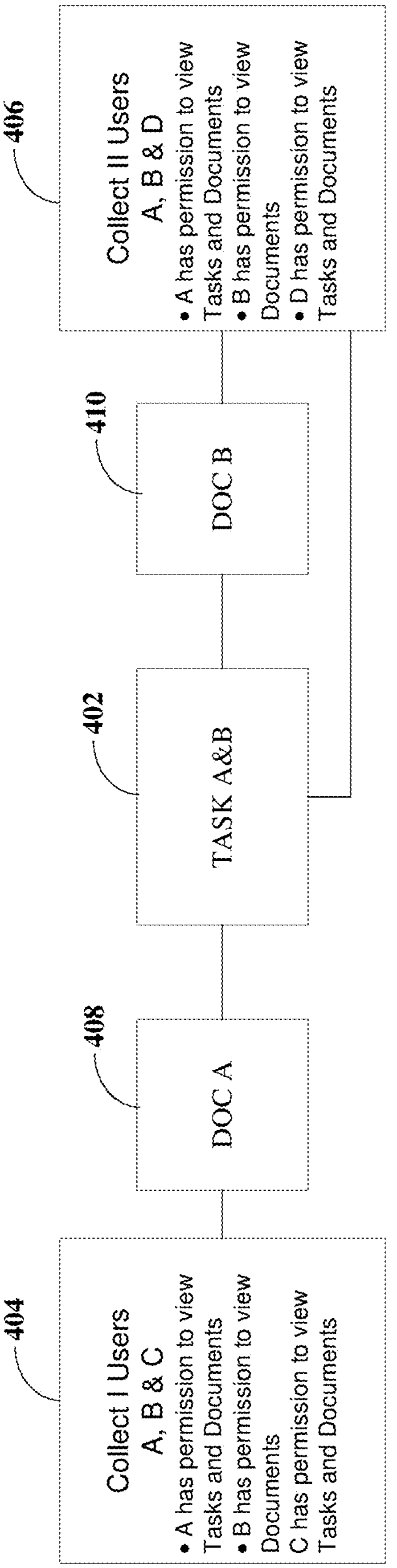
FIG. 6 generally illustrates linked smart data objects according to the principles of the present disclosure.

FIG. 6 is a block diagram illustrating smart data object linking. A task 402 is assigned to a collection 404, a collection 406, and linked to a document 408, and a document 410. The document 408 may be assigned to collection 404 and document 410 may be assigned to collection 406. All permitted users in Collections 404 and 406 will be able to view the task 402 as it is assigned to both collections. While not all users may be able to access document 408 and 410. Smart data object permission controls allow organizational leaders and professionals to be fully informed, conduct activity, and communicate while still restricting information on a need to know basis.

Each smart data object facilities its own contextual communication with users permitted within the collection data object the smart data object is assigned to. Communications are restricted to its collection data objects users which eliminates the risk of inadvertently sending an email to the wrong recipient.

Because collection data objects support both activity, (e.g., operations, reporting compliance) and information management (e.g., documents and communication), separate category systems are available to distinguish these different functions. For activity, collection data objects may include service categories which utilize terminology users use to describe services rendered. Service categories are particularly helpful for managing enterprise information management office activity. Filters for tasks, compliance and meetings all allow for this subject matter type filtering using service categories.

Collection data objects may also include data categories that use common terminology for describing the various documents related to organizational assets and/or liabilities. Data categories permit users to search for specific common documents across the entire enterprise information management office. Further, when users review status of, for example, delivery of tax records to outside CPA's, the user can filter by service category" to determine organizational wide compliance and what has been completed or what is still pending. Additionally, or alternatively, if all of a particular type of document need to be reviewed, a data category associated with that type of document would be used to filter and locate for all organization members within the enterprise information management office. Additionally, or alternatively, if a status of a document is being reviewed by a user, a service category associated with the document would be used to determine status and sufficiency of the document. The use of separate categories systems for services and information allow users to work, determine status of service commitments, and find information using their own language. For documents, the EIM application includes, with smart data objects representing the documents, data categories to identify documents by subject matter, limiting the list to universal terms with goal of filtering to a navigable list.

In some embodiments, and as described, smart data objects allow for recording and tracking of various enterprise information management office functions. From a compliance perspective, enterprise information management offices must honor the individual compliance requirements of every existing entity, asset and liability that is a part of and/or associated with the organization. While at first glance these compliance requirements appear mundane as they are set and rarely change, without technology to support their internal control processes, daily operational demands cause compliance work to oftentimes be postponed, sometimes forgotten or simply not recorded in a way that will be available to the next successor. Compliance risk for organizations can lie latent for decades. If records are not available, the organization will face the associated risk if record support is not available.

The EIM application includes a compliance component The compliance component is configured to assist enterprise information management offices customize the compliance needs on a collection data object basis for every entity, asset and liability representing by a collection data object, so that each occurrence of every separate compliance responsibility is established step by step; scheduled by step; assigned, conducted, recorded by step and reviewed by occurrence. As each step of a compliance responsibilities become due, a compliance occurrence smart data object, generated using information received from a user and/or obtained by the EIM application from other suitable sources, allows the user responsible for the compliance occurrence to communicate, reference source documents, document decisions, exceptions and authorization, and upload and link final work product for review. As users review work for accuracy and sufficiency all communications and information are at their fingertips, contextual and chronological so a minimum amount of time is required for review.

The EIM application generates compliance smart data objects to include separate sub-records for each occurrence, whether daily, weekly, monthly, quarterly, or annually, for each year it remains in effect. Since each occurrence is a separate sub-record, in response to an audit or challenge, enterprise information management offices can immediately access and provide exactly the period or occurrence in question. Many of the compliance smart data objects include generational timelines. It is likely during the lifetime of that compliance responsibility there will be a regulatory, tax, legal or organizational member change that requires one or more steps to be amended. Compliance smart data objects are configured such that all its specific features to be edited. However, the edits will only be applied to open occurrences, leaving any completed occurrence record unaltered for record preservation purposes. This allows each occurrence to properly document its known governance at the time of its completion. The ability to edit compliance smart data objects is also helpful during staff transitions. The compliance smart data object can be edited and reassigned to the new staff member. All activity completed by the former employer remains under their user name and designation for identification purposes. Their prior communications and work is available with a single click for reference and training.

The EIM application utilizes default best practice compliance templates stored in a best practices table of a database. The EIM application uses the templates to apply the best practices to any collection data object which can then be customized to meet the needs and objectives of its collection. Compliance smart data objects are extremely flexible as they can be single or multi-step. Each step is assigned to a specific permitted user and given a due date; compliance instructions, linked governing documents, and steps can be added or removed, reassigned, rescheduled, or other suitable functions. However, any edit only affects open occurrences; for each occurrence, a complete history is available to support its completion; compliance filters allow staff to determine their open work; managers can review all compliance activity for status, and sufficiency for assurances. Also, all recurring work can be assessed, for consistency, productivity, workloads, assessment for new hires, and a basis for calculating expense or fees; attorneys can directly review they compliance for the complex wealth strategies they drafted rather than sending annual letters requesting updates and record for the various compliance duties; work can be outsourced but tightly controlled; external independent audits can be conducted without any disturbance or interruption of family office staff. An auditor can be issued a user access and permission login to work from his office.

In some embodiments, the EIM application generates a user dashboard filter which allows users a quick method of filtering tasks, compliance, and events represented by smart data objects that are assigned to and/or includes the user.

In some embodiments, the EIM application generates collection dashboard filters that sort all pending or completed smart data objects assigned to the collection data object being viewed with or without its sub-collection data objects and all smart data objects, pending or completed, with or without sub-collection data objects.

In some embodiments, the EIM application generates a documents tab filter that allows user to sort all documents, represented by smart data objects, assigned to collection data objects that user has permission to view which helpful for finding common documents across multiple collection data objects. A compliance tab filter allows the user to sort all open or completed compliance, represented by smart data objects, that the user has permission to view which is very helpful for management review of status, productivity, consistency among multiple users, sufficiency, or other suitable information. A complete list of compliance can be generated which is a useful basis for evaluating costs or staffing needs. A tasks tab filter allows the user to sort all open or completed compliance, represented by smart data objects assigned to collection data objects that the user has permission to view. A complete list of tasks, open or completed, can be generated. Since tasks are day to day activities that were not anticipated, this list is helpful to determine level of work by member, advisor, or other suitable role. An events tab filter allows the user to sort all open or completed compliance, represented by smart data objects assigned to collection data objects that the user has permission to view.

FIGS. 7-27 generally illustrate a use case reflecting a typical intra-family transaction that illustrates the activity and information management capabilities of the smart data objects. The EIM application, executed by the EIM system 1000 is configured to perform the steps described herein. The example illustrated in FIGS. 7-27 is for illustrative purposes only and merely represents one of a plurality of scenarios that the EIM application and EIM system 1000 are configured to execute.

Figure 7:
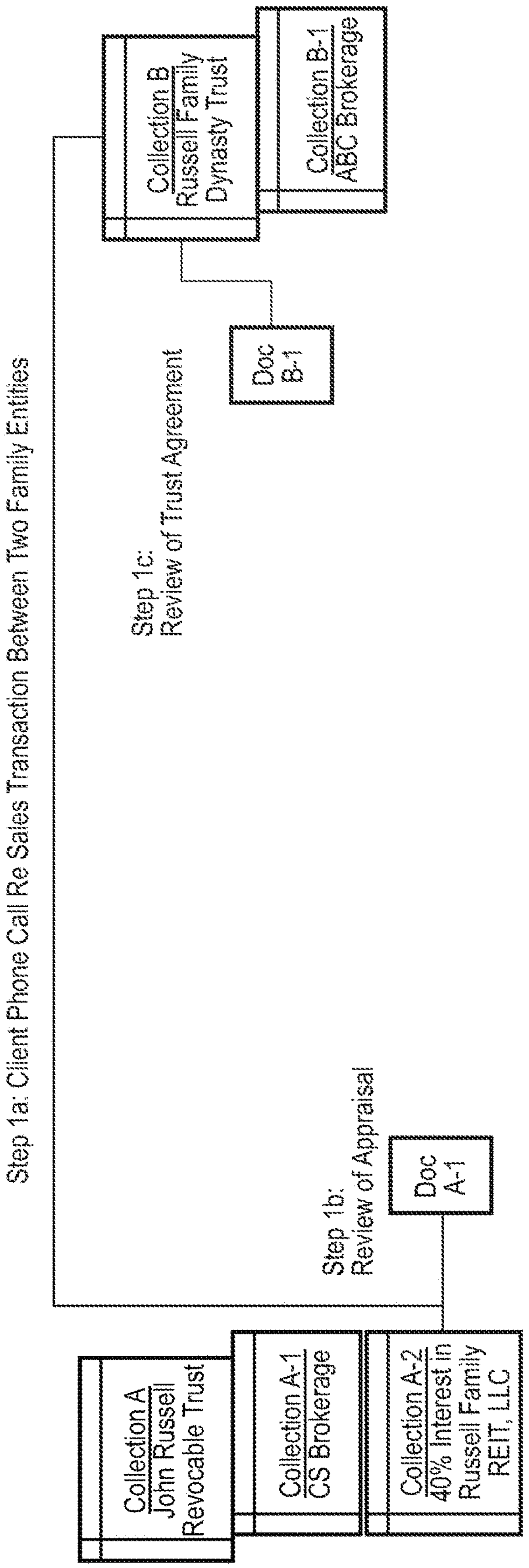
FIGS. 7-27 generally illustrates an example case study according to the principles of the present disclosure.

FIG. 7 generally illustrates a step 1*a*. In step 1*a* a Family Office Manager receives a call from his client, John Russell, regarding the sale of an asset (collection data object A-2) owned in his revocable trust (collection data object A-1) to his family's dynasty trust (collection data object B-1), where John is the Grantor. John and the Trustee have agreed on the sale and want the family office to make it happen in 3-5 days. This transaction arose from a discussion of what to do with the excess cash held in the Dynasty trust brokerage account (collection data object B-1) that was recently received from the sale of another trust asset. The Trust's excess cash needs to be invested and the asset proposed for sale is suitable and was independently appraised within the last few months which would provide a valid basis for establishing a sales price.

Figure 8:

FIG. 8 generally illustrates a step 1*b*, step 1*c*, and step 1*d*. Step 1*b* FO Manager locates and reviews the asset's independent appraisal (Doc A-1) referenced by John. Step 1*c* FO Manager next navigates to the Russell Family Dynasty Trust (collection data object B-1) to review the trust agreement (Doc-B-1) to determine the trustee's responsibility and authority to invest and the most recent trust accounting (Doc B-1) to verify the excess cash position. Since the Family Office ("FO") provides fiduciary administrative support to the Trustee, and to John as Trustee of his Revocable Trust, the FO will represent both the buyer and seller in this transaction. Step 1*d* the information reviewed by the FO Manager is sufficient to reasonably proceed. Consistent with FO policies for recordkeeping, the FO Manager creates a new collection data object, as described above, (collection data object B-2) in the Dynasty Trust to record the due diligence of the proposed asset and record the intentions and actions of the Trustee.

Figure 9:
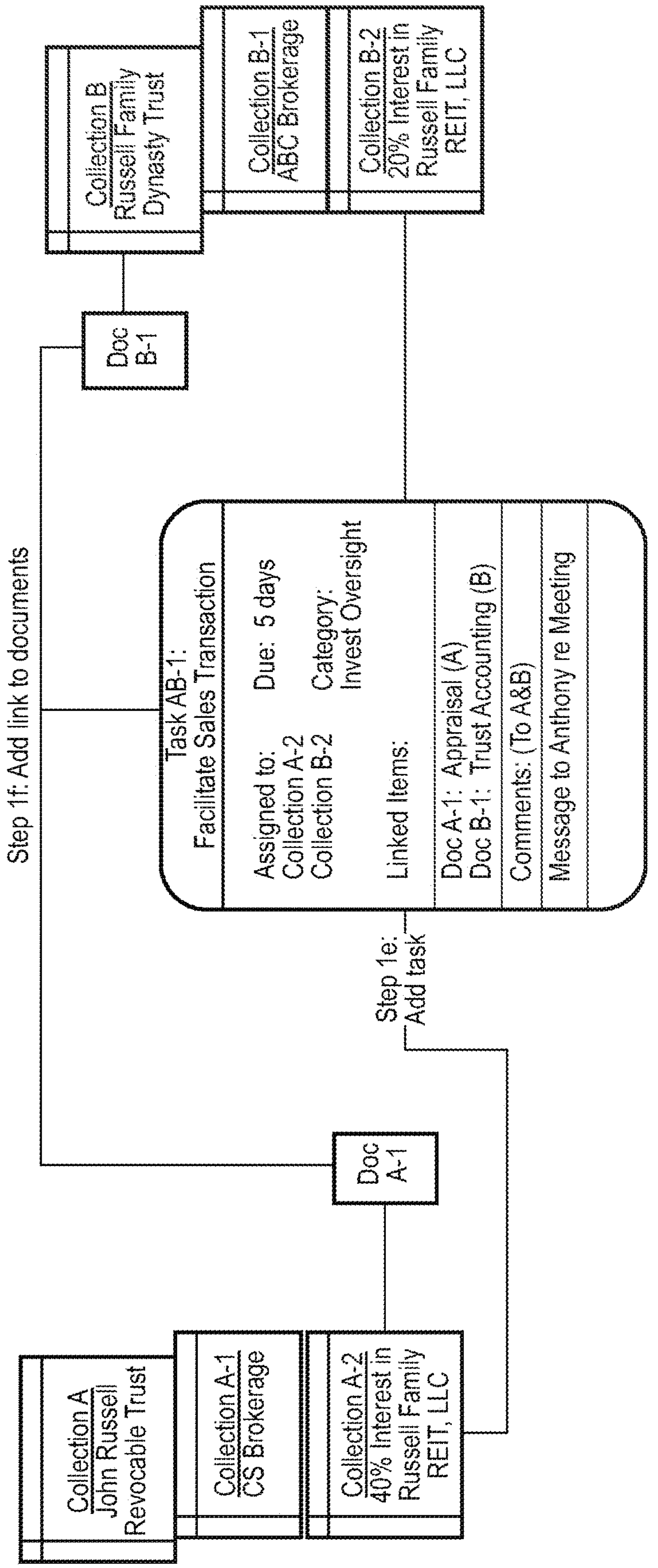

FIG. 9 generally illustrates a step 1*e* and step if Step 1*e* from John's asset Collection Dashboard (collection data object A-2), FO Manager adds a new Task "Facilitate Sales Transaction" to initiate and track this transaction and selects the Service Category of "Investment Oversight". Since the FO is representing both the buyer and seller, the new Task is assigned to both collection data object A-2 and collection data object B-2, to record how it independently oversaw this transaction on behalf of each party. When a Task is assigned to two Collection All Documents stored in each Collection's library are available for linking. All Users who are permitted Users in both Collections will see all activity and documents linked from both Collections. Users who are only a permitted User in one Collection, are limited to viewing only activity and documents linked from their permitted Collection For Task AB-1, any Users that John has permitted in his Collection A-2 who are not a permitted User by the Trustee of the Dynasty Trust will not see and Trust documents or Trust activity to maintain the privacy of the Trust's records while allowing substantial convenience and efficiency for the FO Professionals who are rendering services to both John and the Trustee.

Step 1*f* FO Manager next links the Appraisal (Doc A-1) and the Trust Accounting (Doc B-1) to Task AB-1 to facilitate the Sales Transaction.

Figure 10:
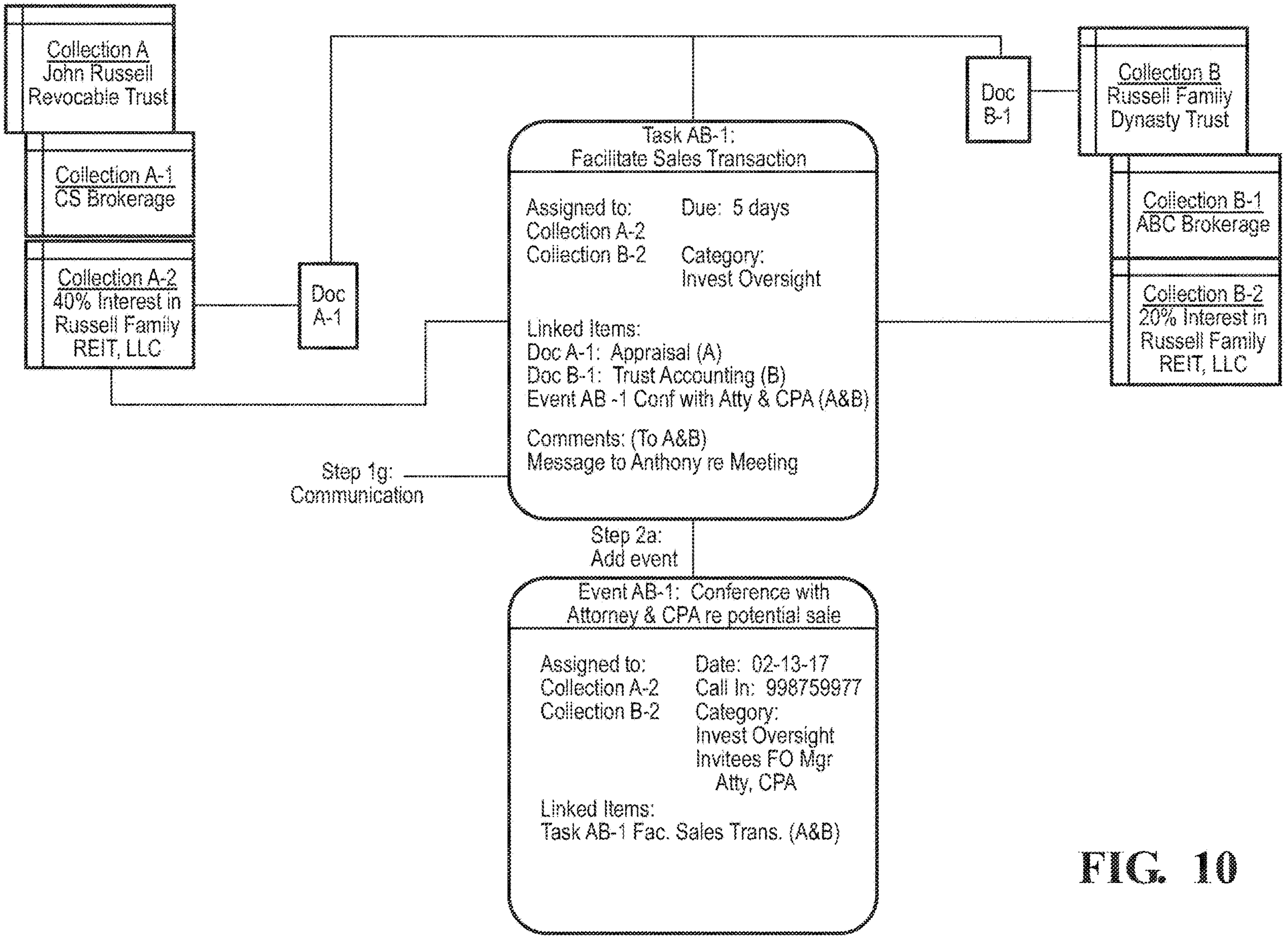

FIG. 10 generally illustrates a step 1*g* and a step 2*a*. Step 1*g* Within the Sales Task AB-1, the FO Manager emails Anthony Comm AB-1 asking him to schedule a conference call with attorney and CPA to discuss the sales strategy.

Step 2*a* Anthony receives the message in his email account, selects the quick link that navigates directly to Task AB-1 details page.

From Task AB-1, Anthony adds an Event AB-1 for the date and time of the telephone conference with call in instructions. The new Event template allows Anthony to provide a title and to select a category "investment Oversight."

Since the users will be discussing the transaction from the perspective of the seller and buyer, the Event is assigned to both collection data objects, allowing all users from each assigned collection data object to be invited. After saving Event AB-1 is created and all invited users will receive an invitation in their email and upon acceptance, the Event will sync with the user's desktop calendar.

Figure 11:
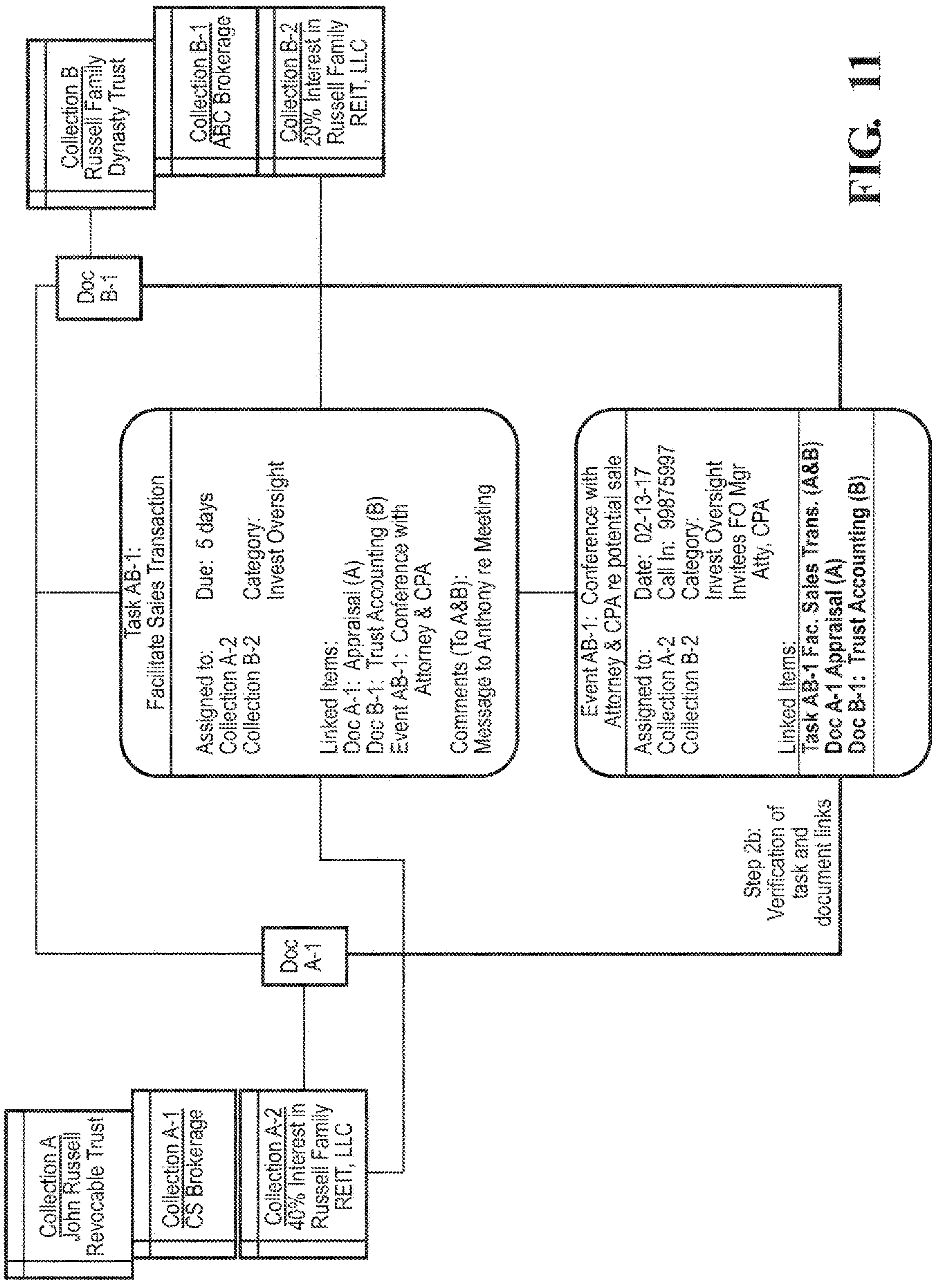

FIG. 11 generally illustrates a step 2*b*. Anthony reviews Event AB-1 details page and verifies that it is linked to the Task AB-1 from which it was created. To double check that he added the Event to the correct task, Anthony navigates through the link back to the Task AB-1.

The EIM application uniquely allows activities such as Tasks, Events and Compliance to be linked (as smart data objects) along with any required Documents to automatically create a dynamic digital record.

Step 2*b* Knowing that the FO's policy is to link all documents (using smart data objects) that are required for review or discussion during an Event, Anthony locates the documents (e.g., using smart data objects representing the documents) referenced in his instructions and links them, using the input interface, to the Event.

Figure 12:
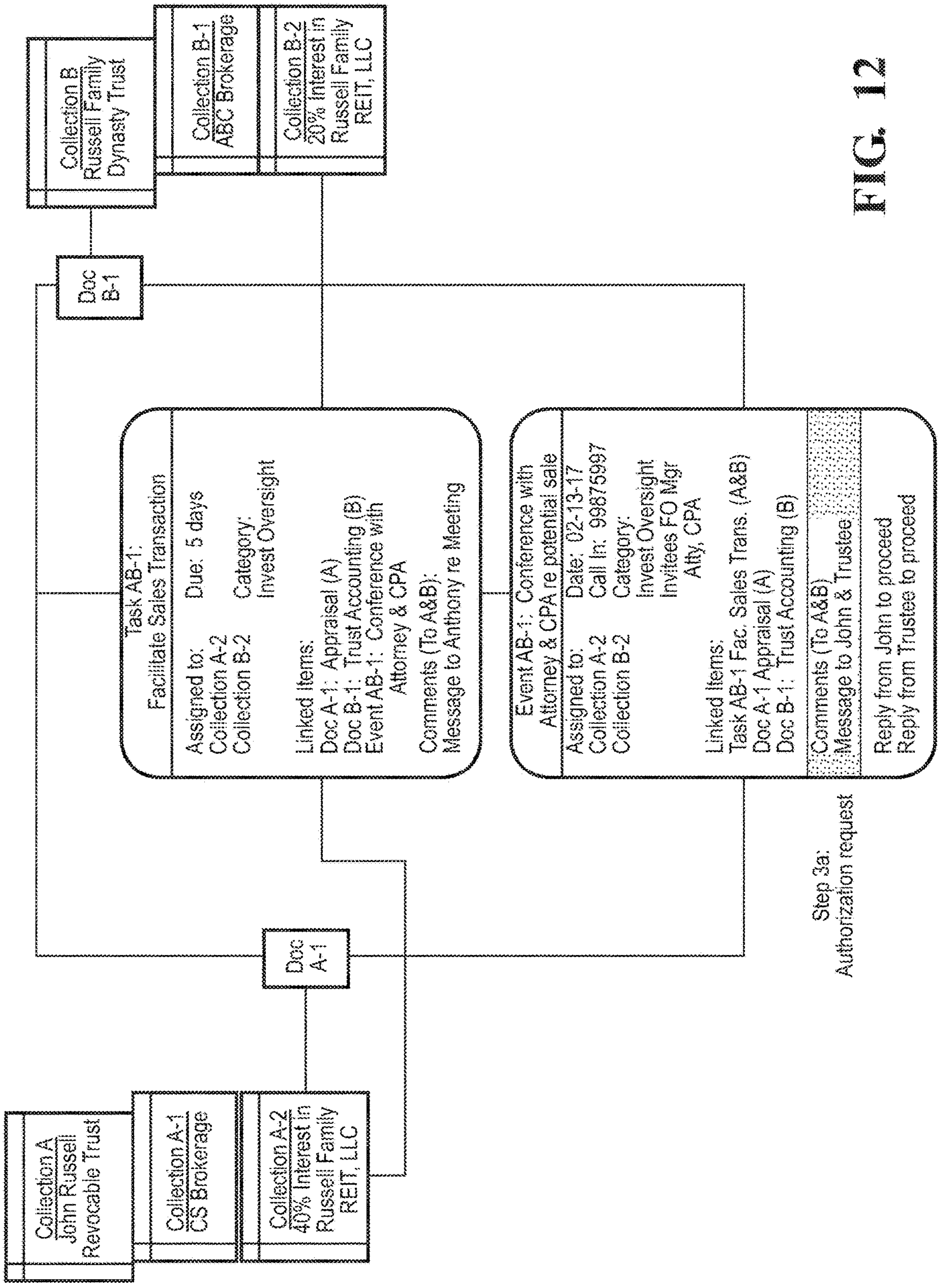

FIG. 12 generally illustrates a step 3*a* and a step 3*b*. When a user needs a document that is not assigned to one of the assigned libraries, its absence should alert users that the desired document may not have been properly filed. The user should use the Document tab and Document filter to locate the desired document and correct any collection data object assignments that had previously been omitted. The Document Tab allows a user to view and search for all Documents in the System that user has permissions to view, irrespective of collection data object assignment. Additionally, or alternatively, its absence would alert the user that another collection data object should be assigned in order to link the required Document, using a respective smart data object, which is the case in the use case described herein. Anthony may realize that both the Trust Accounting and Trust Accounting (Doc B-1) are properly filed at the entity level. Since the Trustee's duties and the Trust assets are being discussed during the call, Anthony edits the Event to also assign it to collection data object B-2.

In step 3*a*, as is generally illustrated in FIG. 12, after the telephone call, FO Manager enters all discussion notes in the comment section of the Event and sends an update to the client John and to the Trustee requesting their confirmation to proceed with retaining counsel to draft the required legal documents.

Step 3*b* After FO Manager received confirmation from John and the Trustee to proceed, FO Manager adds a new Task AB-2 from the event AB-1 to reflect the family office's retention of Attorney, on behalf of Buyer and Seller, and categorizes it as a "Legal Support Service."

The Service Category "Legal Support Services" allows family offices to filter all collection data objects to determine number and status of pending and closing legal matters.

Figure 13:
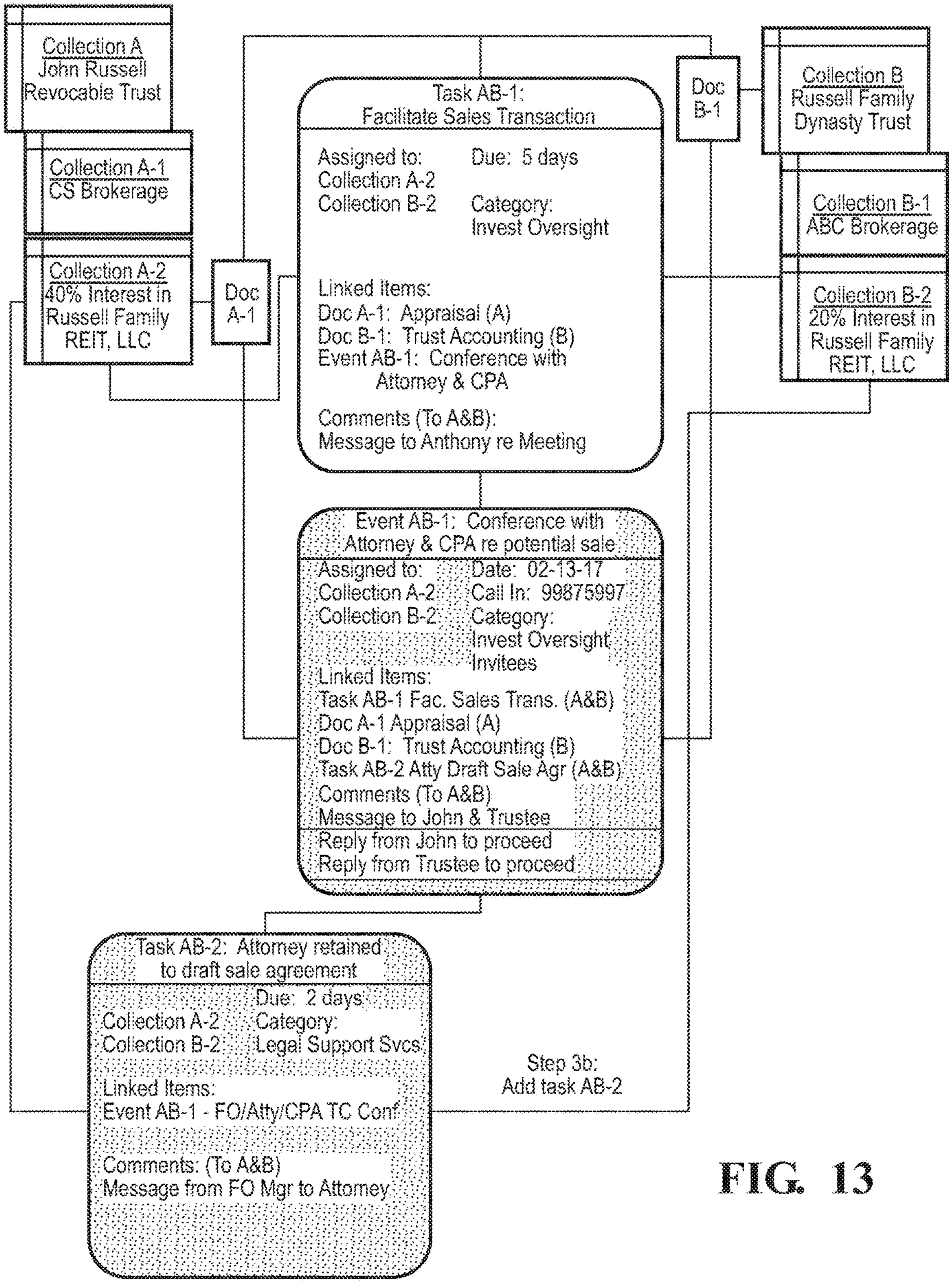

FIG. 13 generally illustrates FO manager adding another Task AB-2 from Event AB-1 to reflect the buyer and seller's retention of Attorney to draft the sales agreement.

Figure 14:
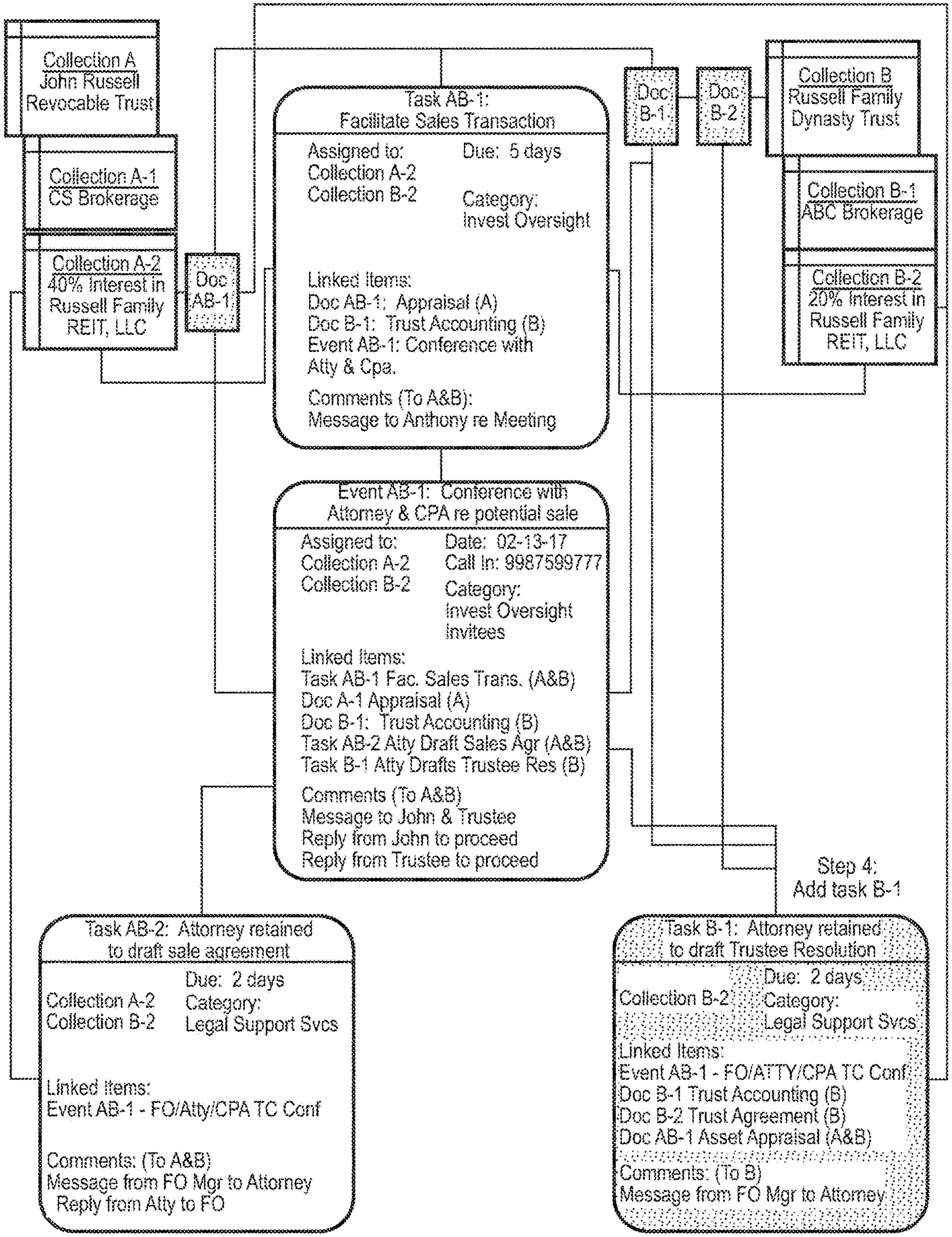

FIG. 14 generally illustrates a step 4. Step 4: FO Manager needs to add another Task B-1 to the Event that only pertains to the buyer which is the Dynasty Trust. The attorney will prepare a Resolution documenting the basis for suitability and the Trustee's exercise of discretion to purchase the trust investment. The Dynasty Trust Agreement (Doc B-2) is linked to record which version was in effect and relied upon at the time of the exercise of discretion to purchase. The document link also serves as a quick reference for the attorney to review the Trust's investment standard.

Since Task B-1 is only assigned to collection data object B-1 and collection data object B-2, any user of collection data object A-1 or collection data object B-1, who is not a User of collection data object B-1 and collection data object B-2 will be not be able to view Task B-1 in the Linked Items list of Event AB-1.

Figure 15:
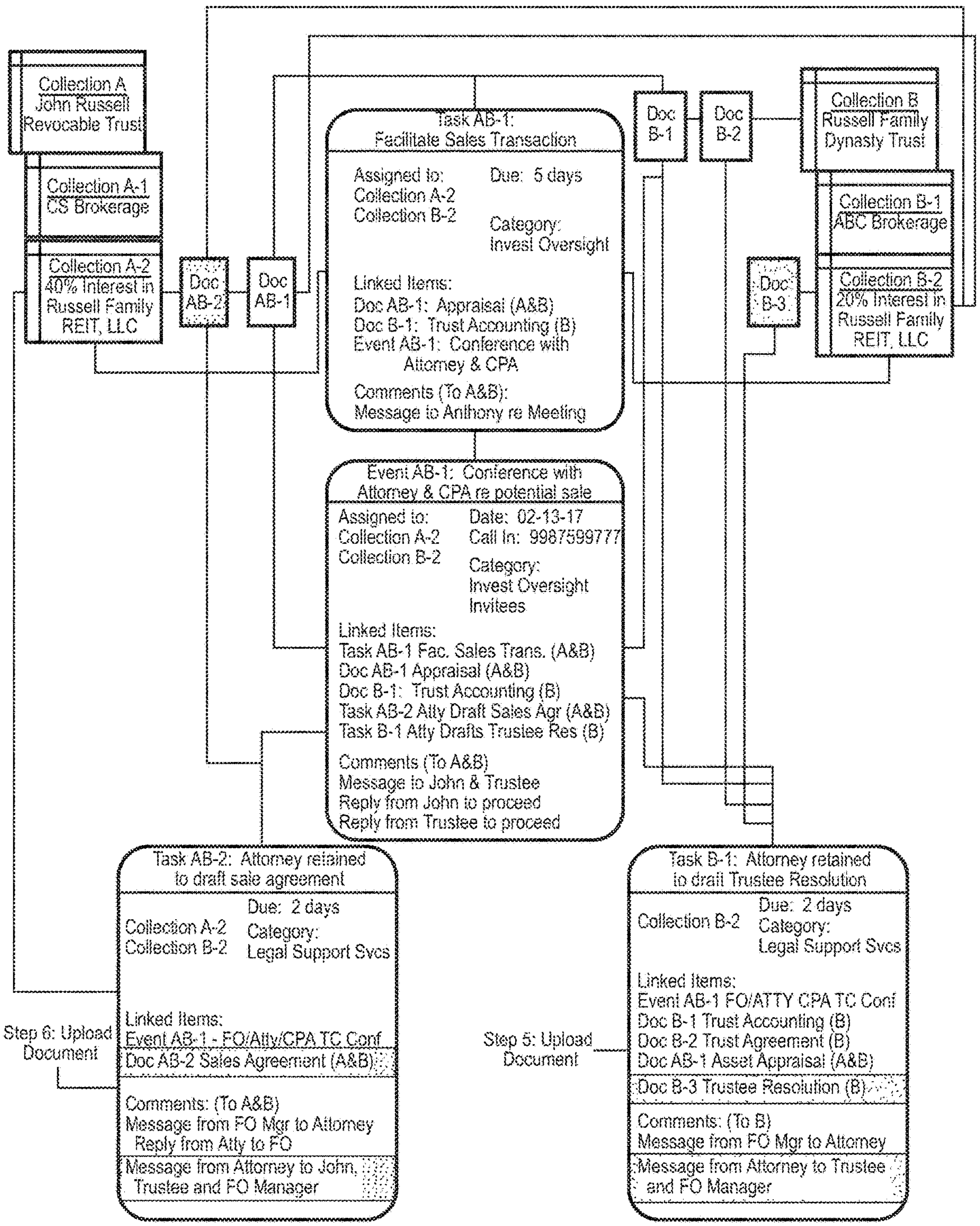

FIG. 15 generally illustrates a step 5 and a step 6. Step 5: After Attorney has drafted the Trustee Resolution, he logs into the EIM application using the client 1004, as described, and immediately on his Dashboard sees the link to Task B-1 which he selects to conveniently and securely upload the new trust resolution Doc B-3 and to provide a copy to the Trustee for review.

Step 6: Later, Attorney completed the draft of the sales agreement (Doc AB-2), he uploads it to the Task AB-2 and notifies the Trustee and the FO Manager.

Figure 16:
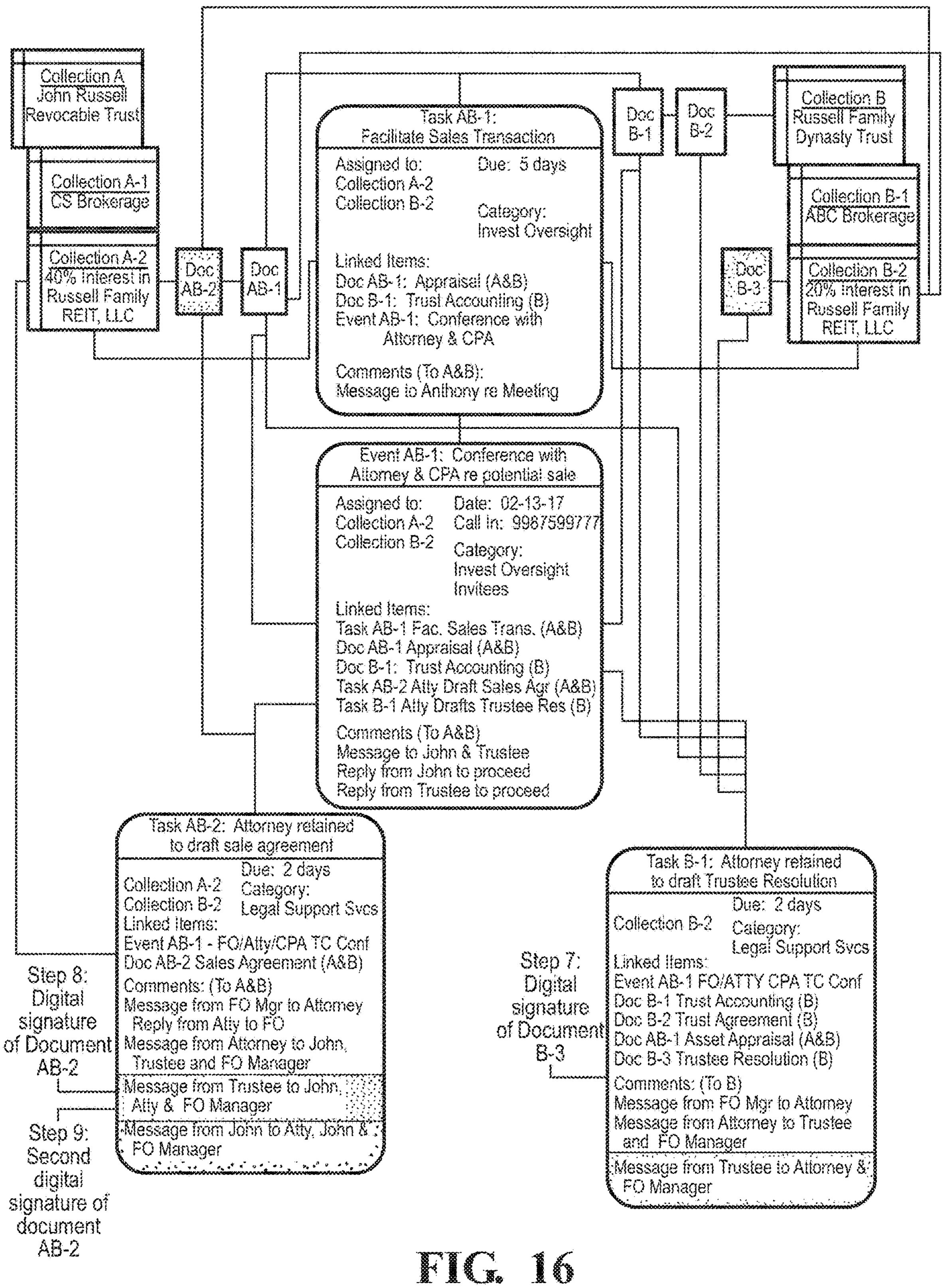

FIG. 16 generally illustrates a step 7, a step 8, and a step 9. Step 7: After the Trustee reviews and signs the Trust Resolution (Doc B-3) he replies to Attorney and FO Manager. Likewise, Trustee reviews and signs the Sales Agreement (Doc AB-2) and replies to authorize the Attorney and FO Manager to proceed with closing the sale once John's signature has been obtained.

Step 8: From Task AB-2, FO Manager emails John, letting him know that the Trustee has signed the Sales Agreement (Doc AB-2) and that his review and signature will allow the FO to proceed with closing the transaction.

Step 9: John reviews the Sales Agreement (Doc AB-2), signs and replies to FO Manager to move forward.

Figure 17:
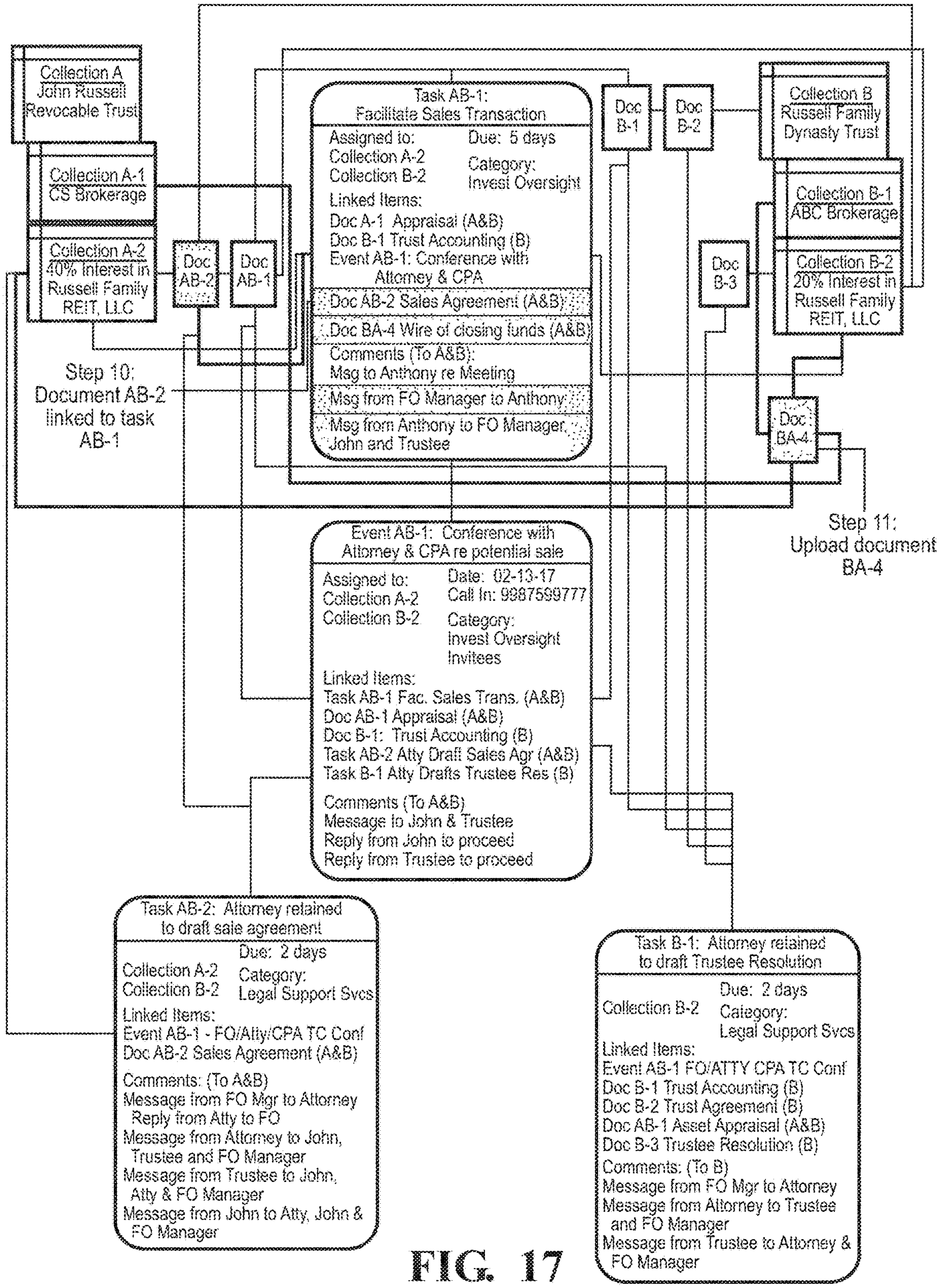

FIG. 17 generally illustrates a step 10 and a step 11. Step 10: From Task AB-1, the FO Manager attached the executed Sales Agreement to Task AB-1 and adds a Comment to Anthony requested that he initiate a wire from the Trust Brokerage collection data object B-1 to the Seller's account collection data object A-1, as designated in the Sales Agreement and marks the Comment private so that only the Link is visible in Anthony's email.

Step 11: After Anthony completes the wire request (Doc BA-4), he uploads a copy and links it 1) to collection data object B-1 brokerage account from which the funds are drawn, 2) collection data object A-1 where the seller's funds are deposited 3) collection data object A-2, as for tax records for the sale 4) and then to the Trust's new asset collection data object B-2 as the record of tax basis and source of funds to purchase the asset.

In the Comment section of the Task AB-1, Anthony replies to the FO Manager, the Trustee and John confirmation that the wire has been initiated, and likewise marks the Comment as private.

Figure 18:
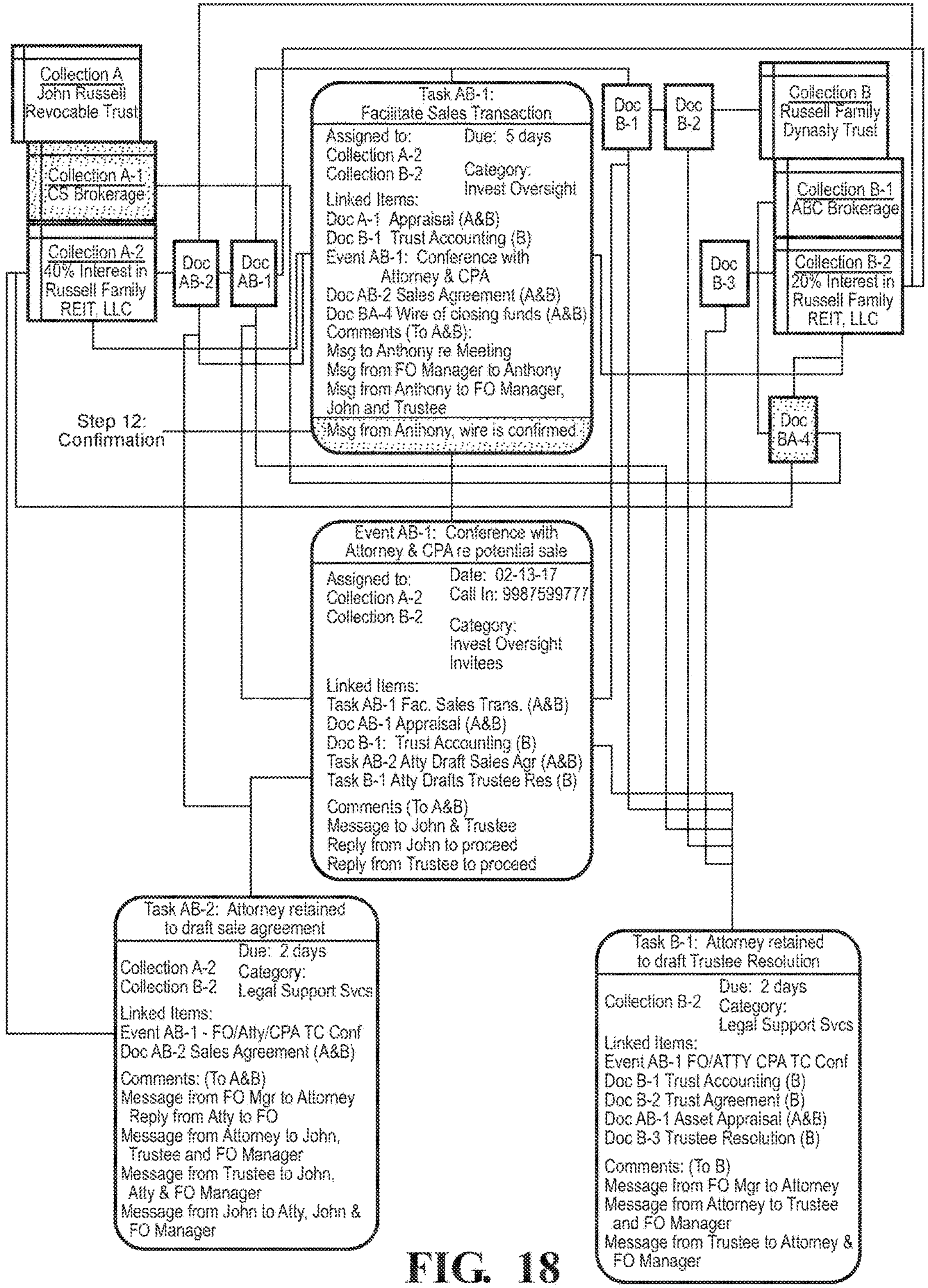

FIG. 18 generally illustrates a step 12. Step 12 Later, Anthony later receives an email from collection data object A-1, CS Brokerage firm, confirming their receipt and deposit of wired funds. Anthony copies the brokerage firm email and pastes it into the comment section of Task AB-1 as a final record that the exchange of funds is complete.

Figure 19:
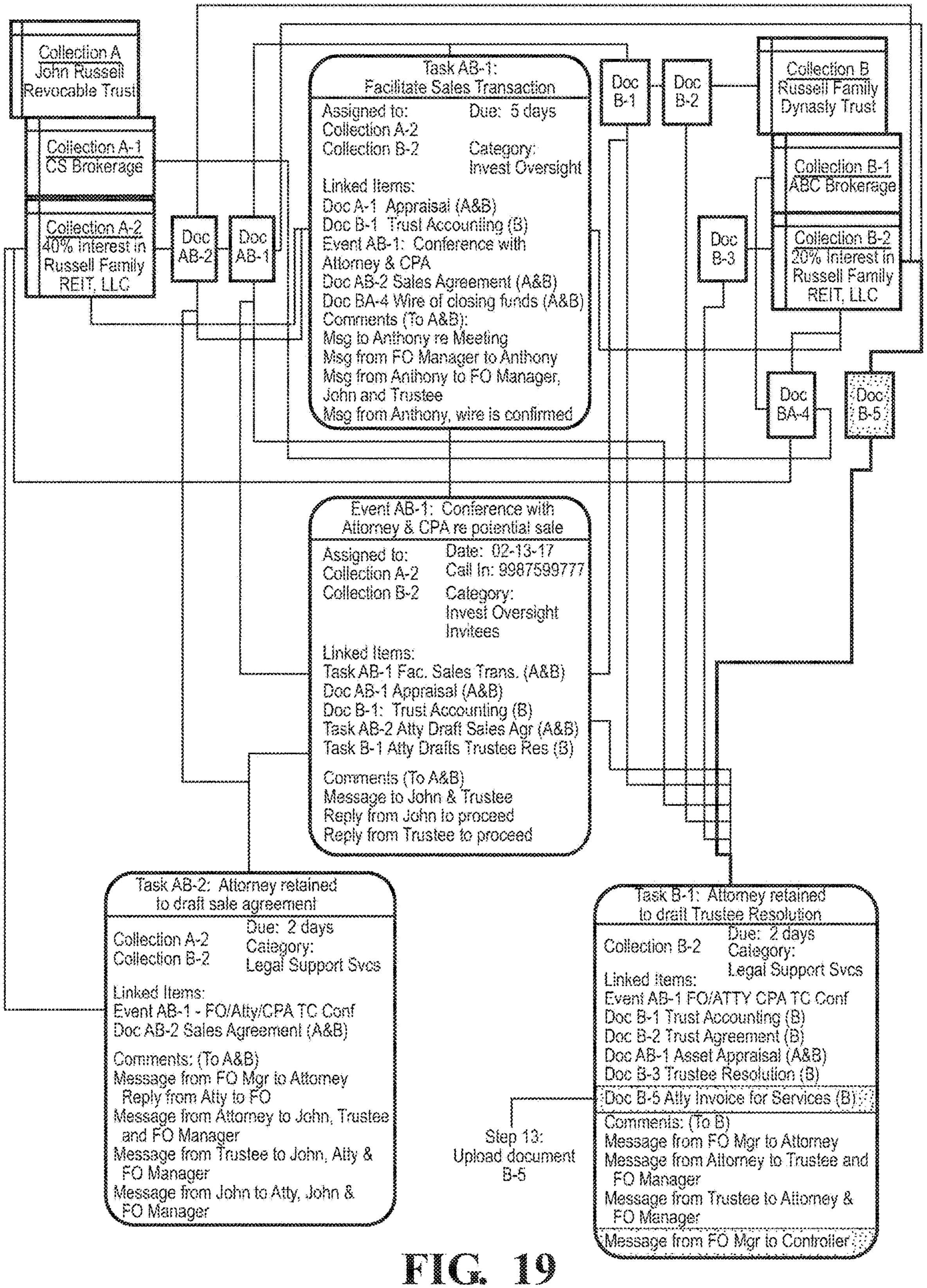

FIG. 19 generally illustrates a step 13. Step 13 FO Manager receives an Invoice from Attorney for services rendered for Task B-1. From the Task B-1 details page, FO Manager uploads the Invoice (Doc B-5) and adds a Comment and sends it to Controller noting that the invoice is approved for payment.

When adding a new document from a Task, Event or Compliance Details Page, the EIM application automatically adds it to the collection data object that the Task (e.g., represented by a smart data object) is assigned to as a convenience for Users.

Figure 20:
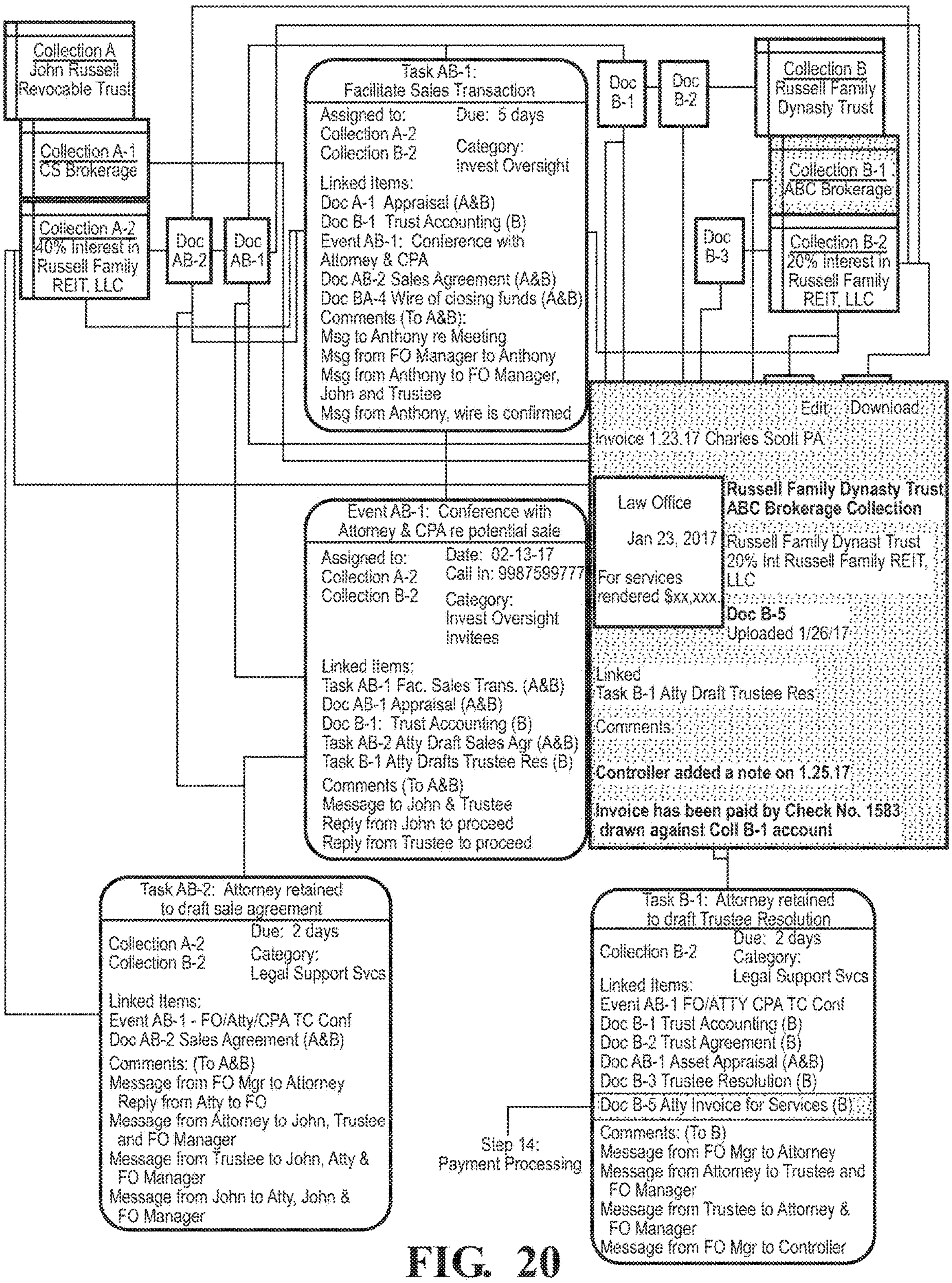

FIG. 20 generally illustrates a step 14. Step 14 Controller receives email that links to Task B-1 to review Legal invoice (Doc B-5) and issues payment from Trust collection data object B-1. Controller then selects the Doc B-5 link to add a note on the Document that payment has been processed and the check number.

Add payment details to the Invoice Documents rather than on the Task details page, allows anyone reviewing office wide invoices with quick reference of processing.

Controller "Edits" Doc B-5 to assign the Invoice to account from which funds were drawn to pay the Invoice which was the ABC Brokerage collection data object B-1. This allows Doc B-5 to be included in the Brokerage account's document library so the bookkeeper will be verifying source documents for all trust disbursements during the reconciliation process.

Figure 21:
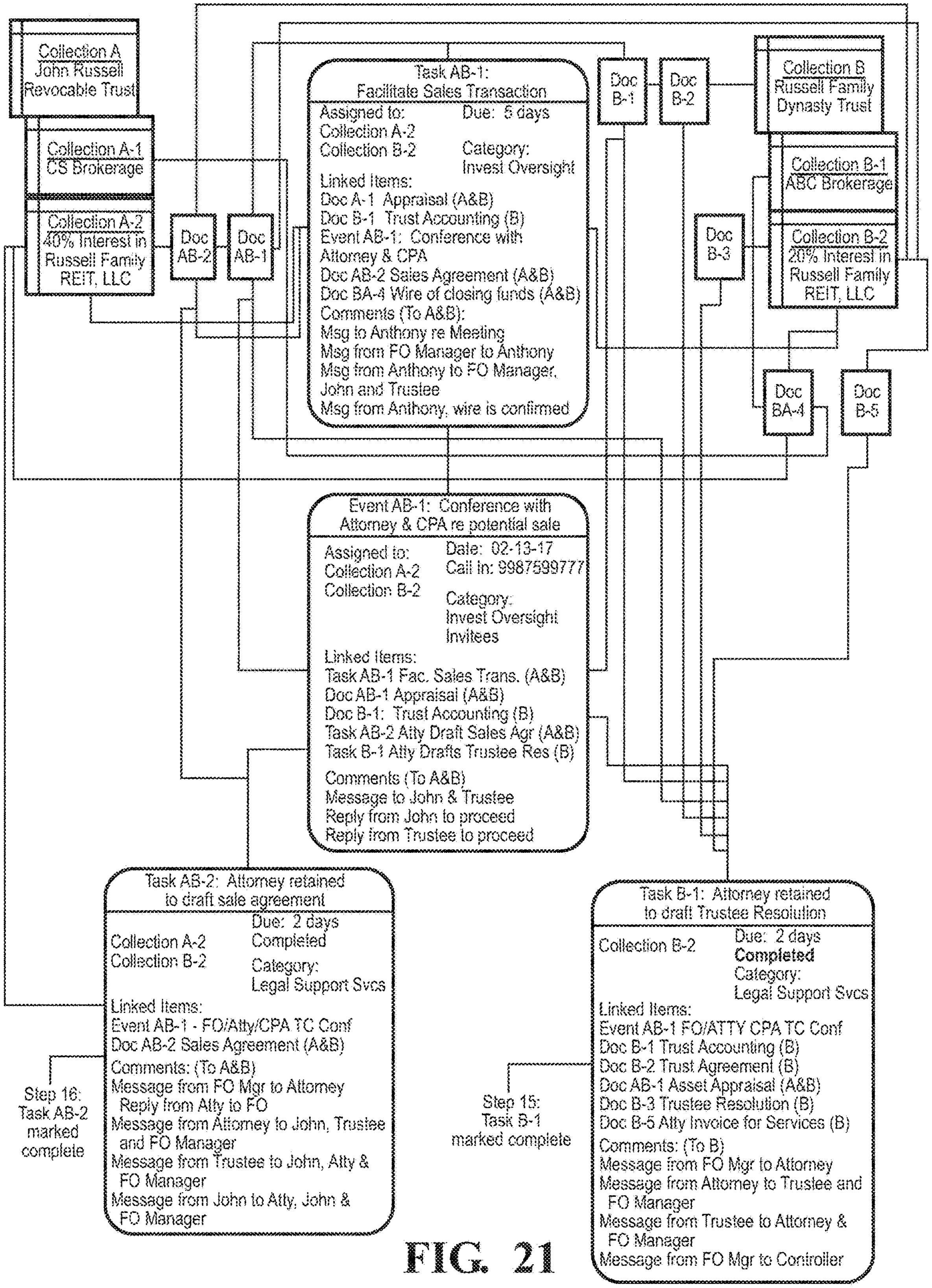

FIG. 21 generally illustrates a step 15 and a step 16. Step 15: Since Task B-1 seems to be complete, FO Manager proceeds with the final review to insure all information reviewed by the Trustee and Attorney is linked or described in the comments. Finding everything in order, FO Manager marks the Trust Task B-1 complete so that the family office's pending legal matters stays current.

Step 16 Likewise, FO Manager completes a final review of the Task AB-2, verifying that the executed Sales Agreement is attached, attorney invoice and record of payment are all linked and then marks Task AB-2 complete.

Figure 22:
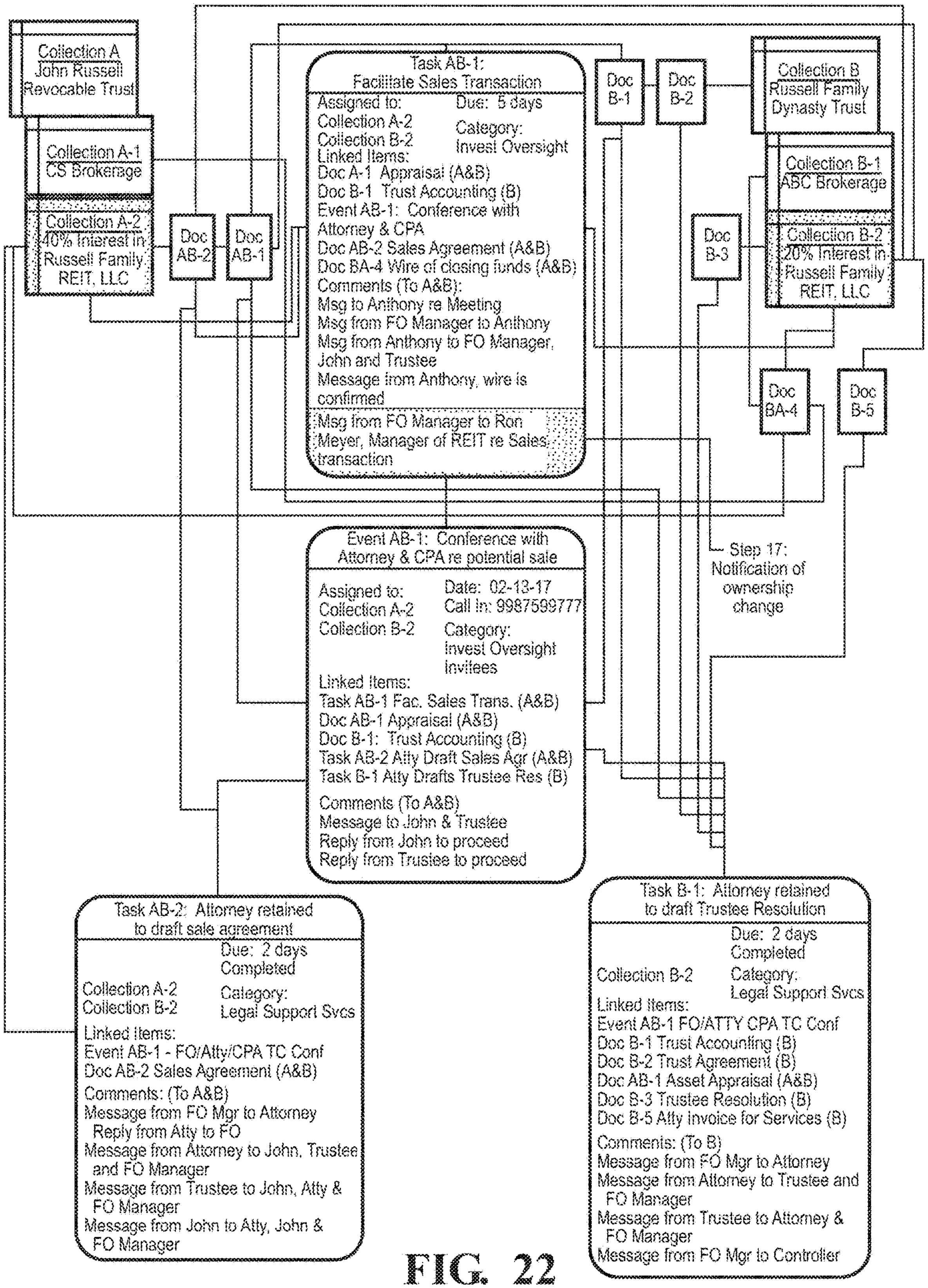

FIG. 22 generally illustrates a step 17. Step 17 From Task AB-1, FO Manager notifies the LLC Manager Ron Meyer of the percentage sale to a new LLC Member and notes that the linked Sales Agreement contains the required language assigning the 20% of John's interest to the Trust.

FO Manager also requests that Ron provide any documents that need to be signed by the new member and that Form K-1's and Financials be provided directly to the Trust in the EIM system 1000, as with other members.

Figure 23:
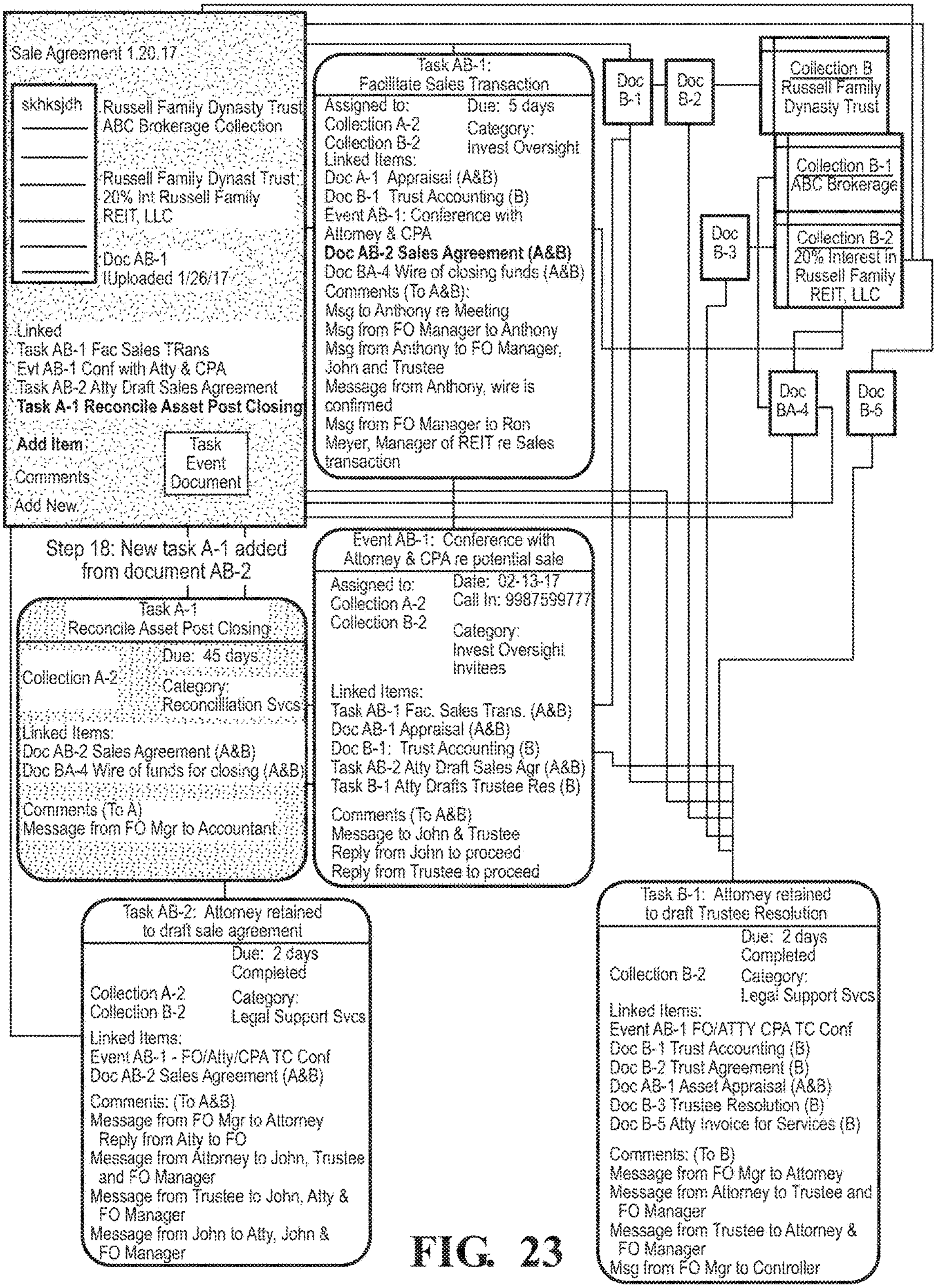

FIG. 23 generally illustrates a step 18. Step 18 From Task AB-1, FO Manager selects the Sales Agreement (Doc AB-2) and then selects "Add Item" to create a new Task A-1 Titled "Reconcile Asset Post Closing," and assigns the new Task A-1 to the family office accountant and selects "Reconciliation Services" as the Service Category. FO manager also attaches the Wire Request reflecting the date, amount and deposit account of the sales proceed for verification.

The Service Category "Reconciliation Services" allows the FO to track progress of on the timely production of FO Financial Statements across all entities.

Figure 24:
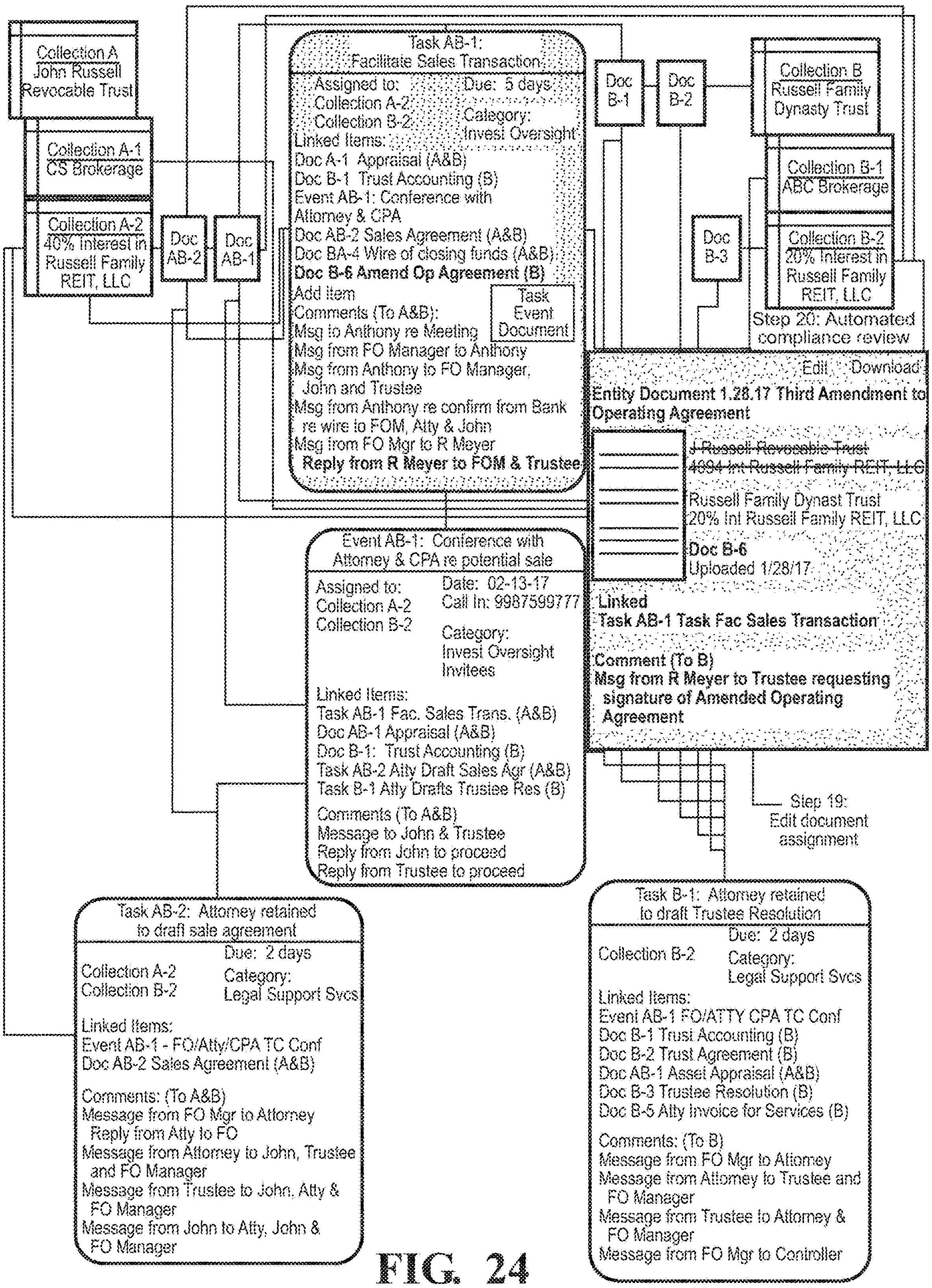

FIG. 24 generally illustrates a step 19. Step 19 To Task AB-1, Ron Meyer uploads the Amendment to the Operating Agreement that the Trustee needs to sign as a new member and requests that the FO Manager obtain the signature of the Trustee. FO Manager notes that Ron improperly uploaded the Document (e.g., using a smart data object representing the document and linked to a collection data object). Since the Task AB-1 is assigned to two collection data objects but the new document only pertains to the Trust collection data object, FO Manager Edits the Document so that it is only assigned to collection data object B-2.

Figure 25:
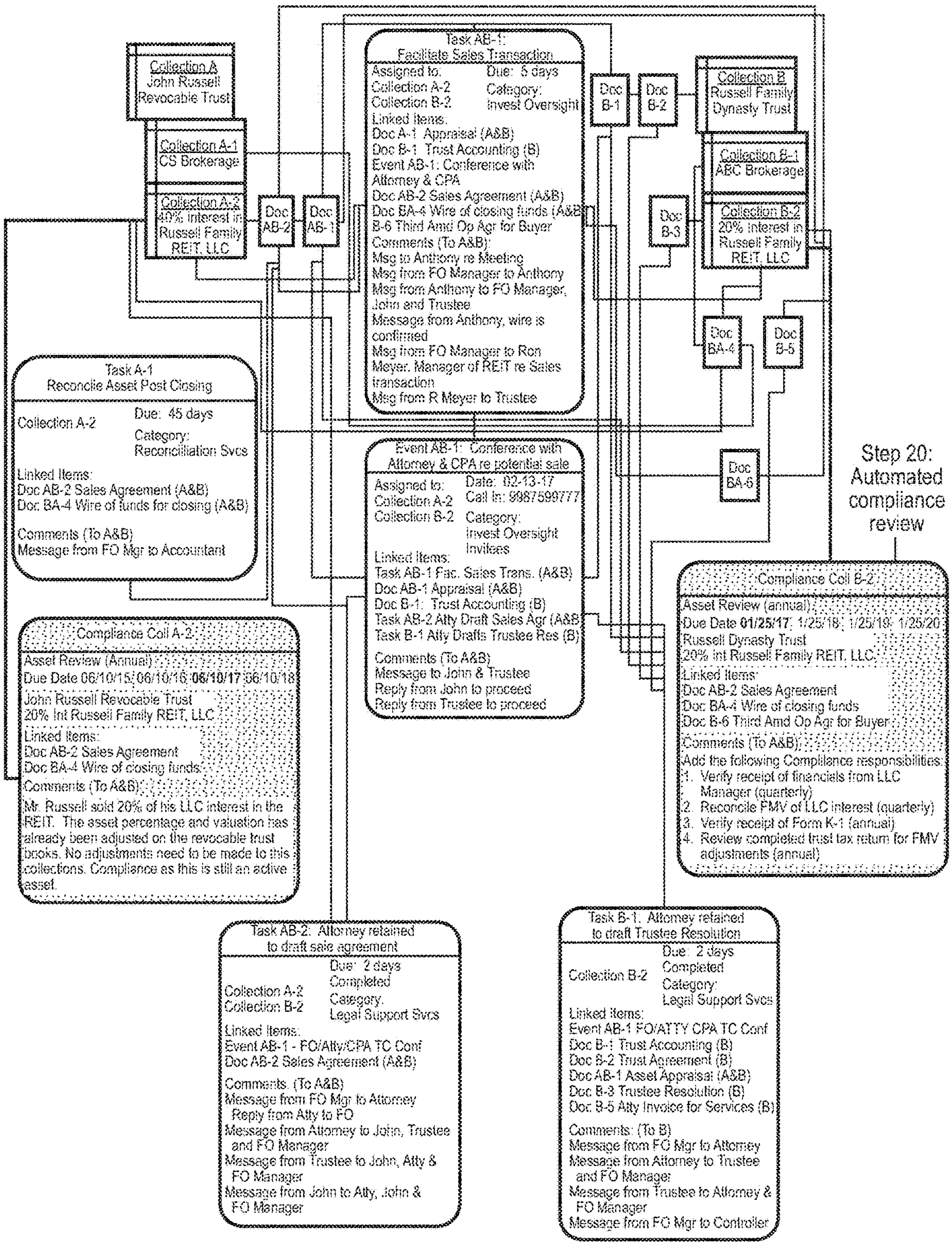
Figure 26:
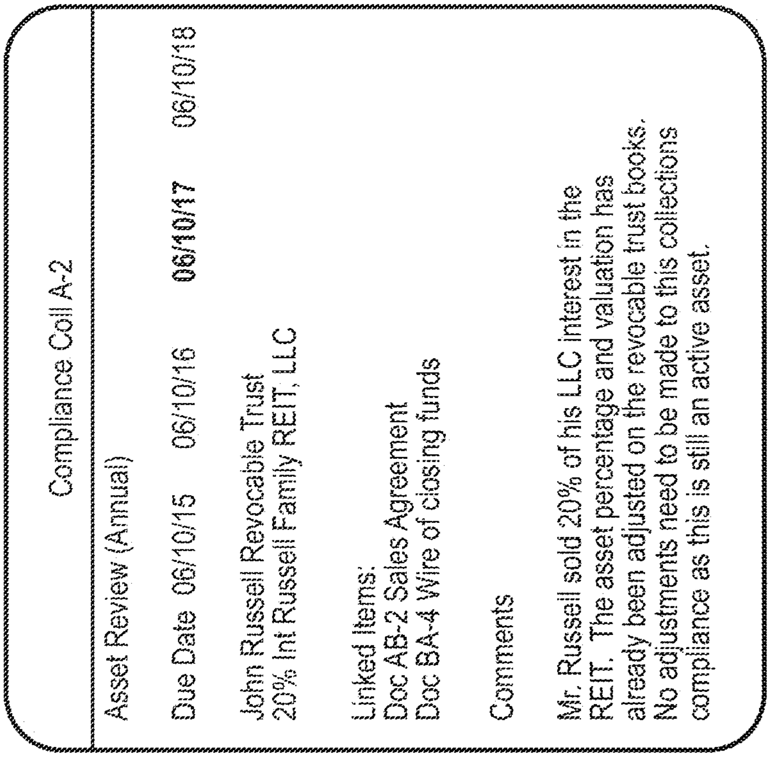
Figure 27:

FIGS. 25-27 generally illustrates a step 20. Step 20 Knowing that when collection data object B-2 was recently created which automatically triggers the application of a Review Compliance template that must be completed within 10 days, FO Manager navigates to collection data object B-2 and locates Compliance B-1 that is pending and assigned to her to conduct the initial review of the yearly Review Compliance record.

Figure 28:
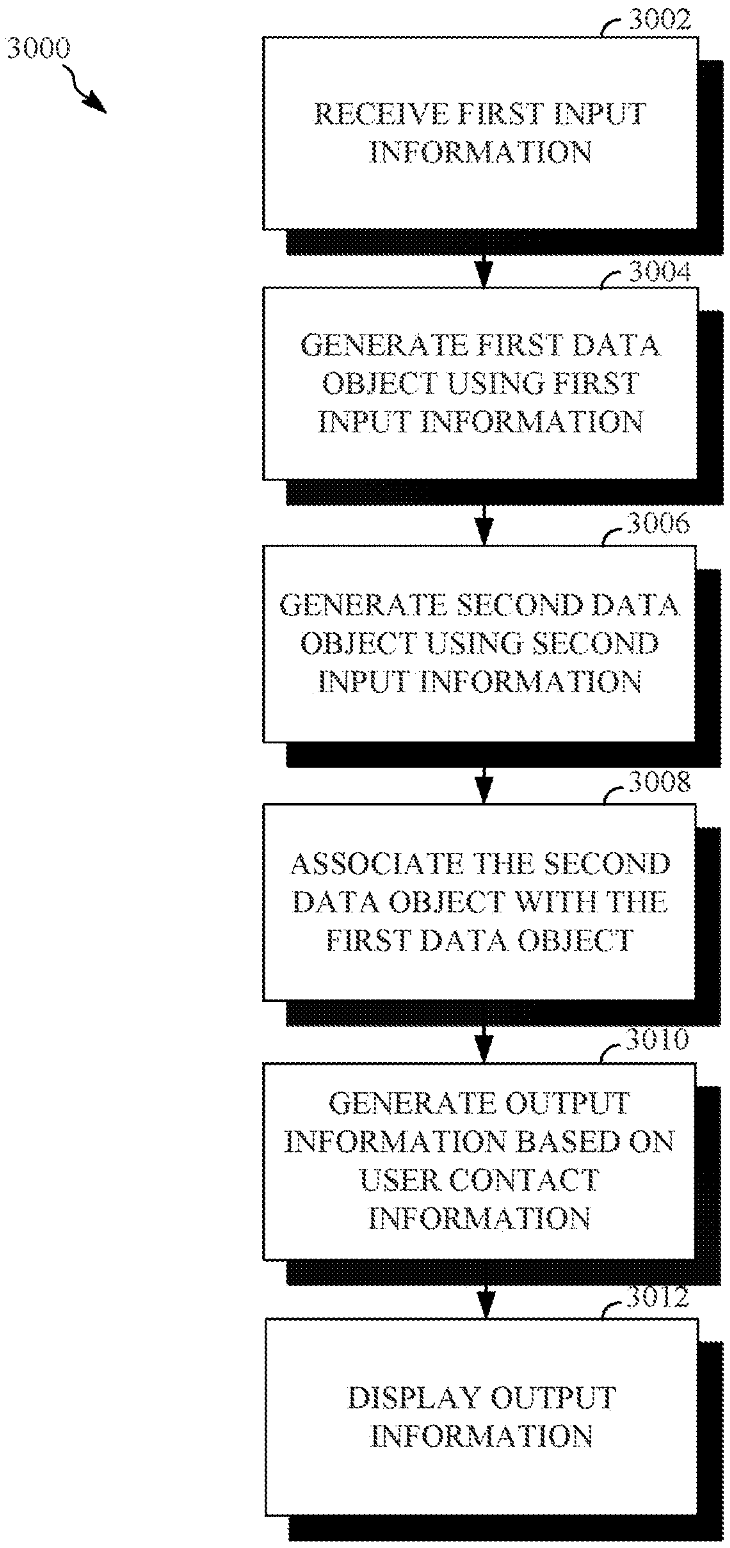
FIG. 28 is a flow diagram of a process for managing enterprise information according to the principles of the present disclosure.
Figure 29:
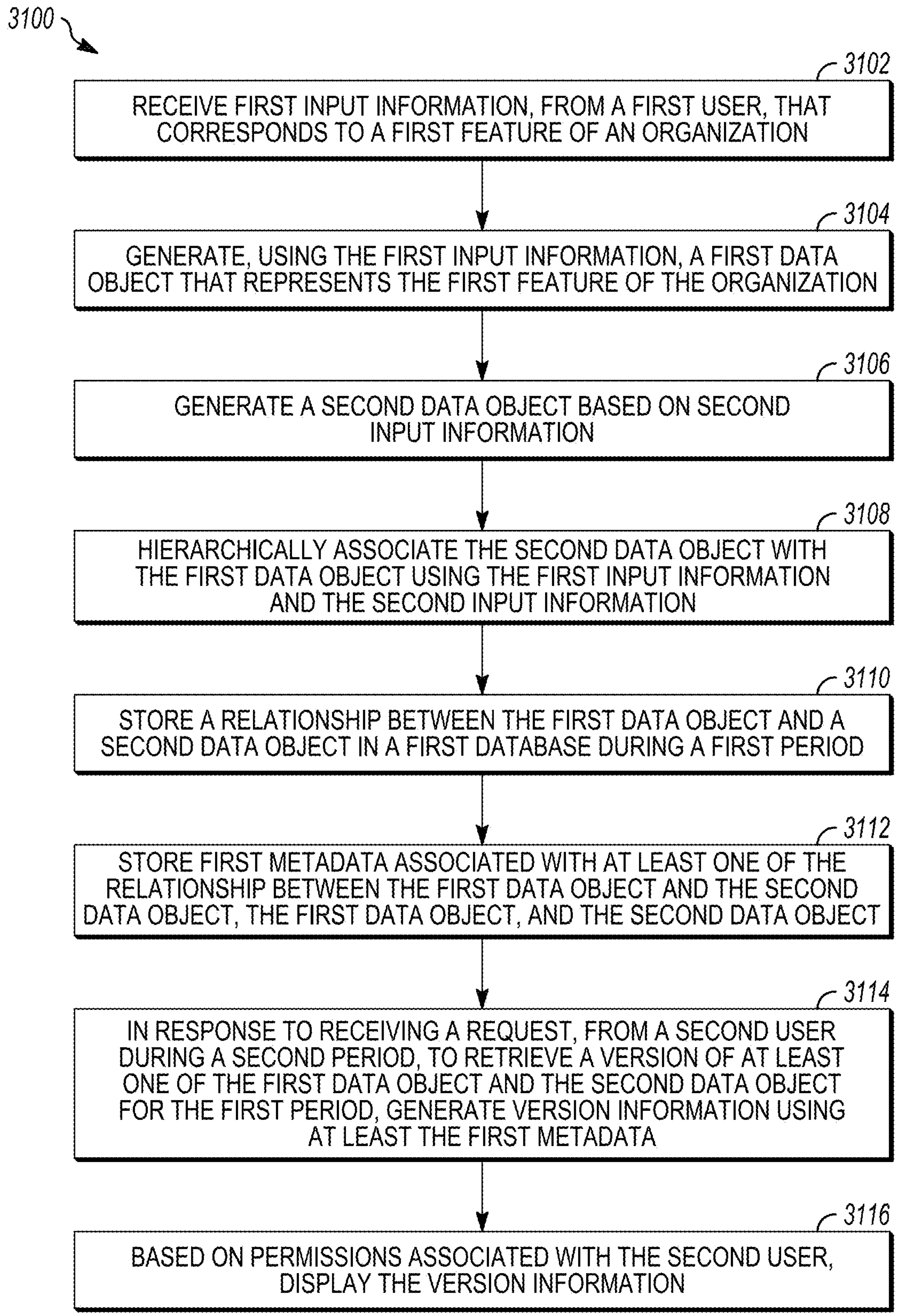
FIG. 29 is a flow diagram of an alternative process for managing enterprise information according to the principles of the present disclosure.

FIG. 28 is a flow diagram of a process 3000 for managing enterprise information according to the principles of the present disclosure. At 3002, the process 3000 receives first input information. For example, the EIM application receives, as described, input information from a user using an input interface. In some embodiments, the input interface may be accessed by the user using a client computing device, such as a client instance of the computing device 2000. The input interface, via the client computing device, may be configured to communicate information received from the user to the EIM application, being executed on a server computing device, as described. The input information may be associated with a first feature of an organization. For example, the input information may represent real-world characteristics of the first feature of the organization. At 3004, the process 3000 generates a first data object using the first input information. For example, the EIM application, as described, generates a first collection data object based on the first input information. The first collection data object represents the real-world characteristics of the first feature.

At 3006, the process 3000 generates a second data object using second input information. For example, the EIM application, as described, may receive information from the user associated with a task, even, document, compliance, or other suitable information associated with the first collection data object. The EIM application generates a smart data object using the second input information. At 3008, the process 3000 associates the second data object with the first data object. For example, the EIM application, as described, may hierarchically associate the second data object with the first data object using the first input information and/or the second input information.

At 3010, the process 3000 generates output information based on user contact information. For example, the EIM application, as described generates output information based on the contact information associated with the user attempting to access the first data object and/or the second data object. The output information may represent portions of the first data object and the second data object that the user, according to the contact information, has permission to view and/or interact with. At 3012, the process 3000 displays the output information. For example, the EIM application, as described, may use a suitable display to display the output information. The output information may be displayed using the output interface 100, as described.

FIG. 39 is a flow diagram of an alternative process 3100 for managing enterprise information according to the principles of the present disclosure. At 3102, the process 3100 receives first input information, from a first user, that corresponds to a first feature of an organization. For example, the EIM application may receive input information from a user using an input interface. In some embodiments, the input interface may be accessed by the user using a client computing device, such as a client instance of the computing device 2000. The input interface, via the client computing device, may be configured to communicate information received from the user to the EIM application, being executed on a server computing device. The input information may be associated with a first feature of an organization. For example, the input information may represent real-world characteristics of the first feature of the organization.

At 3104, the process 3100 generates, using the first input information, a first data object that represents the first feature of the organization. For example, the EIM application may generate a first collection data object based on the first input information. The first collection data object represents the real-world characteristics of the first feature.

At 3106, the process 3100 generates a second data object using second input information. For example, the EIM application, may receive information from the user associated with a task, even, document, compliance, or other suitable information associated with the first collection data object. The EIM application may generate a smart data object using the second input information.

At 3108, the process 3100 hierarchically associates the second data object with the first data object using the first input information and the second input information. For example, the EIM application may hierarchically associate the second data object with the first data object using the first input information and/or the second input information.

At 3110, the process 3100 stores a relationship between the first data object and the second data object in a first database during a first period. For example, the EIM application may identify a relationship between the first data object and the second data object. The EIM application may store, in the first database, the relationship between the first data object and the second data object. In some embodiments, the EIM application may store the relationship between the first data object and the second data object, the first data object, the second data object, other information, or a combination thereof in the first database. The relationship between the first data object and the second data object may correspond to a relationship between the first data object and the second data object during the first period. The first period may correspond to a point in time that a user created, accessed, generated, updated, and the like the first data object and/or the second data object. The relationship may include any suitable relationship include user permissions associated with the first data object and/or the second data object, semantic meaning of the first data object and/or the second data object, business rules associated with the EIM application during the first period, other suitable information regarding the EIM application, the first data object, and/or the second data object during the first period, any other suitable information, or a combination thereof.

At 3112, the process 3100 stores first metadata associated with at least one of the relationship between the first data object and the second data object, the first data object, and the second data object. For example, the EIM application may generate metadata associated with at least one of the relationship between the first data object and the second data object, the first data object, and the second data object. The metadata may include any suitable information, data, metadata, and the like, such as those described herein. The EIM application may store the metadata associated with at least one of the relationship between the first data object and the second data object, the first data object, and the second data object.

At 3114, the process 3100, in response to receiving, from a second user during a second period, a request for a version of at least one of the first data object and the second data object during the first period, generates version information using at least the first metadata. For example, the EIM application may retrieve from the versions database, or other suitable database, the first data object, the second data object, the first metadata, the relationship between the first data object and the second data object, other suitable information, or a combination thereof. The EIM application may generate, using the information retrieved from the versions database, version information associated with the first data object and/or the second data object during the first period in response to the second user requesting the version of the first data object and/or the second data object during the second period. The second period may be subsequent to the first period. The second user may be a subsequent user to users associated with the first data object and/or the second data object during the first period or one of the user associated with the first data object and/or the second data object during the first period. The version information may indicate business rules associated with the EIM application, the first data object and/or the second data object during the first period, semantic meaning of the relationship between the first data object and the second data object during the first period, semantic meaning of the first data object during the first period, semantic meaning of the second data object during the first period, user information (e.g., user name, user access permissions, and the like) associated with the first data object and/or the second data object during the first period, data structure information associated with the first data object and/or the second data object during the first period, visual display information associated with the first data object and/or the second data object during the first period, other suitable information, or a combination thereof.

At 3116, the process 3100, based on permissions associated with the second user, displays the version information. For example, the EIM application may determine whether the second user has permission to view the first data object and/or the second data object during the first period. If the EIM application determines that the second user has permissions to access the first data object and/or the second data object during the first period, the EIM application may display the version information. Alternatively, the EIM application may discard the version information.

In some embodiments, the EIM application may be configured to allow users of the EIM application, but assigned to or associated with different instances of the EIM application, to conduct a specific and/or mutually agreed upon transition(s) (e.g., any activity conducted jointly between two distinct family offices, which may include but is not limited to a joint work product, sale of an asset, agreement, legally binding contract, etc. and may include an auditable history of the intermediary steps of the transaction, the chain of custody of any documents or resources involved in the transaction, an immutable version of the final work products, and the like). For example, a first user (e.g., which may be referred to as a native user) may be associated with a first instance of the EIM application of a first family office and a second user (e.g., which may be referred to as a foreign user) may be associated with a second instance of the EIM application of a second family office that is completely separate from the first instance of the EIM application.

The first instance of the EIM application and the second instance of the EIM application may perform a digital "handshake" between to establish identity via a securely exchanged token, and the establishment of a secure channel of communication utilizing cryptographic methods and/or any other suitable methods. Once this occurs, each family office, via respective instances of the EIM application, electronically submits a list of the users and their respective roles for the duration of the transaction (e.g., which may have a specified duration or may be ongoing until a particular goal is met). In some embodiments, the receiving family office reviews and accepts the users and roles of the sending family office, resulting in the reviewed and accepted users becoming foreign users of the receiving family office's instance of the EIM application. Foreign users have no roles or access privileges initially but can be granted roles and access in the same manner as native users (e.g., as described herein with respect to users of the EIM application) at the full discretion of the administrator or administrators of the receiving family office. It should be understood that, the family office of the first instance of the EIM application, for example, may provide the family office of the second instance of the EIM application with the list of users, but has no control over what access rights the users are granted within the second instance of the EIM application, and vice versa.

In some embodiments, after foreign users have been accepted by the family office of the first instance of the EIM application and the family office of the second instance of the EIM application, any number of collections (e.g., a repository of documents and/or information associated with the transaction) can be created (e.g., by either or both instances of the EIM application) and associated with the transaction.

The collections can be disposed or stored, by either or both instances of the EIM application, in a collection hierarchy of each family office separately and independently of each other. The collections may include sub-collections as needed to represent the structure of the transaction. Either instance of the EIM application may generate links between smart objects of the collections, to other smart objects within the collections, or to objects that exist outside the collections designated as part of the transaction. Links to smart objects outside the a collection of the first instance of the EIM application designated as part of the transaction may be invisible to the users associated with the second instance of the EIM application. However, the entire contents of collections designated as part of the Transaction may be replicated on both instances of the EIM application, such that, all users associated with the transaction may have access to the contents of the collections (e.g., based on the granted rights if respective users). In this manner, the instances of the EIM application guarantee that family office can access an identical copy the contents of the collections at any given point in time. Any changes made by one family office to any part of this shared collection structure, including the addition of smart objects, the alteration or deletion of existing smart objects, or the addition of comments, will always be available to the other family office. Access by native and foreign users is governed independently by the rules of each instance of the EIM application as described herein.

At the completion of the transaction, all smart objects, comments, activity logs, and data that are contained within the collections designed as part of the transaction may be cryptographically sealed, by each respective instance of the EIM application, to establish a final and immutable version of the products of the transaction. Each family office may retain an identical copy of this data and the cryptographic data necessary to establish that both family offices possess an identical and unaltered copy of the final work product. The EIM application (e.g., either instance) may revoke all rights granted to foreign users at the completion of the transaction. It should be understood that, while examples of given illustrating the interaction of two family offices (e.g., and two instances of the EIM application), the systems and methods described herein may be applicable to any suitable number of family offices (e.g., and instances of the EIM application).

In some embodiments, a method for enterprise information management includes receiving, at a server computing device, first input information, from a first user using a client computing device, that corresponds to a first identifying a first feature of an organization. The method further includes generating, by the server computing device and using the first input information, a first data object that represents the first feature of the organization. The method further includes generating, by the server computing device, a second data object based on second input information. The method further includes hierarchically associating, by the server computing device, the second data object with the first data object using the first input information and the second input information. The method further includes storing, by the server computing device, a relationship between the first data object and the second data object in a first database. The method further includes generating, by the server computing device output information, in response to a second user accessing the first data object, based on the first data object, the second data object, and contact information associated with the second user and retrieved from a second database separate from the first database, wherein the output information includes a subset of information indicated by the first data object and the second data object, the subset of information being determined based on access rights indicated by the contact information. The method further includes displaying, on the client computing device, the output information on a display.

In some embodiments, the first data object represents at least one physical attribute of the first feature of the organization. In some embodiments, the first data object represents owner information associated with the first feature of the organization. In some embodiments, the first feature of the organization includes an asset of the organization. In some embodiments, the first feature of the organization includes a liability of the organization. In some embodiments, the second data object represents a document associated with the first feature of the organization. In some embodiments, the second data object represents a task associated with the first feature of the organization.

In some embodiments, system for enterprise information management includes a memory and a processor, wherein the memory includes instructions executable by the processor to: receive first input information, from a first user, that corresponds to a first identifying a first feature of an organization; generate, using the first input information, a first data object that represents the first feature of the organization; generate a second data object based on second input information; hierarchically associate the second data object with the first data object using the first input information and the second input information; generate output information, in response to a second user accessing the first data object, based on the first data object, the second data object, and contact information associated with the second user; and display the output information on a display.

In some embodiments, the first data object represents at least one physical attribute of the first feature of the organization. In some embodiments, the first data object represents owner information associated with the first feature of the organization. In some embodiments, the first feature of the organization includes an asset of the organization. In some embodiments, the first feature of the organization includes a liability of the organization. In some embodiments, the second data object represents a document associated with the first feature of the organization. In some embodiments, the second data object represents a task associated with the first feature of the organization.

Some embodiments, according to the principles of the present disclosure, include, a non-transitory computer-readable storage medium, comprising executable instructions that, when executed by a processor, facilitate performance of operations, comprising: receiving first input information, from a first user, that corresponds to a first identifying a first feature of an organization; generating, using the first input information, a first data object that represents the first feature of the organization; generating a second data object based on second input information; hierarchically associating the second data object with the first data object using the first input information and the second input information; generating output information, in response to a second user accessing the first data object, based on the first data object, the second data object, and contact information associated with the second user; and displaying the output information on a display.

In some embodiments, the first data object represents at least one physical attribute of the first feature of the organization. In some embodiments, the first data object represents owner information associated with the first feature of the organization. In some embodiments, the first feature of the organization includes an asset of the organization. In some embodiments, the first feature of the organization includes a liability of the organization. In some embodiments, the second data object represents a document associated with the first feature of the organization. In some embodiments, the second data object represents a task associated with the first feature of the organization.

In some embodiments a computer-implemented method for enterprise information management includes receiving, by a server computing device, first input information, from a first user using a client computing device, that corresponds to a first feature of an organization and generating, by the server computing device and using the first input information, a first data object that represents the first feature of the organization. The method also includes generating, by the server computing device, a second data object based on second input information and hierarchically associating, by the server computing device, the second data object with the first data object using the first input information and the second input information. The method also includes storing, by the server computing device, a relationship between the first data object and the second data object in a first database during a first period and storing, by the server computing device, first metadata associated with at least one of the relationship between the first data object, the first data object, and the second data object in the first database, the first metadata corresponding to metadata associated with the at least one of the relationship between the first data object, the first data object, and the second data object during the first period. The method also includes, in response to a request from a second user during a second period to retrieve, for the first period, a version of at least one of the first data object and the second data object, generating version information using at least the first metadata and based on permissions associated with the second user, displaying, on the client device, the version information.

In some embodiments, the first data object represents at least one physical attribute of the first feature of the organization. In some embodiments, the first data object represents owner information associated with the first feature of the organization. In some embodiments, the first feature of the organization includes an asset of the organization. In some embodiments, the first metadata indicates at least one semantic significance the at least one of the relationship between the first data object, the first data object, and the second data object during the first period. In some embodiments, the first metadata indicates at least one business rule the at least one of the relationship between the first data object, the first data object, and the second data object during the first period. In some embodiments, the first metadata indicates a data structure corresponding to the first data object and the second data object during the first period.

In some embodiments, a system for enterprise information management includes a memory and a processor. The memory includes instructions executable by the processor to: receive first input information, from a first user using a client computing device, that corresponds to a first feature of an organization; generate, using the first input information, a first data object that represents the first feature of the organization; generate a second data object based on second input information; hierarchically associate the second data object with the first data object using the first input information and the second input information; store a relationship between the first data object and the second data object in a first database during a first period; store first metadata associated with at least one of the relationship between the first data object, the first data object, and the second data object in the first database, the first metadata corresponding to metadata associated with the at least one of the relationship between the first data object, the first data object, and the second data object during the first period; in response to a request from a second user during a second period to retrieve, for the first period, a version of at least one of the first data object and the second data object, generating version information using at least the first metadata; and based on permissions associated with the second user, display the version information.

In some embodiments, the first data object represents at least one physical attribute of the first feature of the organization. In some embodiments, the first data object represents owner information associated with the first feature of the organization. In some embodiments, the first feature of the organization includes an asset of the organization. In some embodiments, the first metadata indicates at least one semantic significance the at least one of the relationship between the first data object, the first data object, and the second data object during the first period. In some embodiments, the first metadata indicates at least one business rule the at least one of the relationship between the first data object, the first data object, and the second data object during the first period. In some embodiments, the first metadata indicates a data structure corresponding to the first data object and the second data object during the first period.

In some embodiments, a non-transitory computer-readable storage medium, includes executable instructions that, when executed by a processor, facilitate performance of operations, comprising: receiving first input information, from a first user using a client computing device, that corresponds to a first feature of an organization; generating, using the first input information, a first data object that represents the first feature of the organization; generating a second data object based on second input information; hierarchically associating the second data object with the first data object using the first input information and the second input information; storing a relationship between the first data object and the second data object in a first database during a first period; storing first metadata associated with at least one of the relationship between the first data object, the first data object, and the second data object in the first database, the first metadata corresponding to metadata associated with the at least one of the relationship between the first data object, the first data object, and the second data object during the first period; in response to a request from a second user during a second period to retrieve, for the first period, a version of at least one of the first data object and the second data object, generating version information using at least the first metadata; and based on permissions associated with the second user, displaying the version information.

In some embodiments, the first data object represents owner information associated with the first feature of the organization. In some embodiments, the first feature of the organization includes an asset of the organization. In some embodiments, the first metadata indicates at least one semantic significance the at least one of the relationship between the first data object, the first data object, and the second data object during the first period. In some embodiments, the first metadata indicates at least one business rule the at least one of the relationship between the first data object, the first data object, and the second data object during the first period. In some embodiments, the first metadata indicates a data structure corresponding to the first data object and the second data object during the first period.

In some embodiments, a computer-implemented method for enterprise information management includes: receiving, by a server computing device at a first instance of an enterprise information management application, first input information, from a first user using a client computing device, that corresponds to a first feature of an organization; generating, by the server computing device at the first instance of the enterprise information management application and using the first input information, a first data object that represents the first feature of the organization; hierarchically associating, by the server computing device at the first instance of the enterprise information management application, a second data object with the first data object using the first input information and a second input information associated with the second data object; storing, by the server computing device at the first instance of the enterprise information management application, first metadata associated with a relationship between the first data object and the second data object in a first database during a first period; in response to a request from a second user associated with a second instance of the enterprise information management application to retrieve, during a second period and for the first period, a version of at least one of the first data object and the second data object, generating version information using at least the first metadata; and based on permissions associated with the second user granted to the second user by the first instance of the enterprise information management application, displaying, on at the second instance of the enterprise information management application, the version information.

In some embodiments, the first data object represents at least one physical attribute of the first feature of the organization. In some embodiments, the first data object represents owner information associated with the first feature of the organization. In some embodiments, the first feature of the organization includes an asset of the organization. In some embodiments, the first metadata indicates at least one semantic significance the at least one of the relationship between the first data object and the second data object during the first period. In some embodiments, the first metadata indicates at least one business rule the at least one of the relationship between the first data object and the second data object during the first period. In some embodiments, the first metadata indicates a data structure corresponding to the first data object and the second data object during the first period. In some embodiments, data objects of the first instance of the enterprise information management application are not accessible by users of the second instance of the enterprise information management application without permission granted to users of the second instance of the enterprise information management application by the first instance of the enterprise information management application.

In some embodiments, a system for enterprise information management incudes: a memory; and a processor, wherein the memory includes instructions executable by the processor to: receive, by a server computing device at a first instance of an enterprise information management application, first input information, from a first user using a client computing device, that corresponds to a first feature of an organization; generate, by the server computing device at the first instance of the enterprise information management application and using the first input information, a first data object that represents the first feature of the organization; hierarchically associate, by the server computing device at the first instance of the enterprise information management application, a second data object with the first data object using the first input information and a second input information associated with the second data object; store, by the server computing device at the first instance of the enterprise information management application, first metadata associated with a relationship between the first data object and the second data object in a first database during a first period; in response to a request from a second user associated with a second instance of the enterprise information management application to retrieve, during a second period and for the first period, a version of at least one of the first data object and the second data object, generate version information using at least the first metadata; and based on permissions associated with the second user granted to the second user by the first instance of the enterprise information management application, display, on at the second instance of the enterprise information management application, the version information.

In some embodiments, the first data object represents at least one physical attribute of the first feature of the organization. In some embodiments, the first data object represents owner information associated with the first feature of the organization. In some embodiments, the first feature of the organization includes an asset of the organization. In some embodiments, the first metadata indicates at least one semantic significance the at least one of the relationship between the first data object and the second data object during the first period. In some embodiments, the first metadata indicates at least one business rule the at least one of the relationship between the first data object and the second data object during the first period. In some embodiments, the first metadata indicates a data structure corresponding to the first data object and the second data object during the first period. In some embodiments, data objects of the first instance of the enterprise information management application are not accessible by users of the second instance of the enterprise information management application without permission granted to users of the second instance of the enterprise information management application by the first instance of the enterprise information management application.

In some embodiments, a non-transitory computer-readable storage medium, comprising executable instructions that, when executed by a processor, facilitate performance of operations, comprising: receiving, by a server computing device at a first instance of an enterprise information management application, first input information, from a first user using a client computing device, that corresponds to a first feature of an organization; generating, by the server computing device at the first instance of the enterprise information management application and using the first input information, a first data object that represents the first feature of the organization; hierarchically associating, by the server computing device at the first instance of the enterprise information management application, at least one other data object with the first data object using at least the first input information; storing, by the server computing device at the first instance of the enterprise information management application, a relationship between the first data object and the at least one other data object; generating, by the server computing device at the first instance of the enterprise information management application, a first data object collection that includes at least one of the first data object and the at least one other data object; receiving, at the first instance of the enterprise information management application from a second instance of the enterprise information management application, a request for a second user associated with the second instance of the enterprise information management application to access the first data object collection; assigning access permissions to the second user on the first instance of the enterprise information management application; and in response to a request from the second user associated with the second instance of the enterprise information management application to access, at the first data object collection of the first instance of the enterprise information management application, at least one of the first data object and the at least one other data object, allowing, based on the access permissions of the second user on the first instance of the enterprise information management application, the second user to access the at least one of the first data object and the at least one other data object at the first data object collection.

In some embodiments, data objects of the first instance of the enterprise information management application are not accessible by users of the second instance of the enterprise information management application without permission granted to users of the second instance of the enterprise information management application by the first instance of the enterprise information management application. In some embodiments, after a period, the first instance of the enterprise information management application revokes the permissions of the second user on the first instance of the enterprise information management application. In some embodiments, the period corresponds to an end of a transaction associated with the first data object collection.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "of" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general-purpose computer or general-purpose processor with a computer program that, when executed, carries out any of the respective methods, algorithms and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A computer-implemented method for enterprise information management, comprising:

generating, at a first instance of an enterprise information management application by a server computing device and using first input information corresponding to a first feature of an organization, a first data object that represents the first feature of the organization;

generating, by the server computing device, a second data object based on second input information;

hierarchically associating, by the server computing device, the second data object with the first data object using the first input information and the second input information;

storing, by the server computing device, a relationship between the first data object and the second data object during a first period;

storing, by the server computing device and in a first database, first metadata associated with at least one of the relationship between the first data object and the second data object during the first period, the first data object during the first period, and the second data object during the first period;

receiving, from a user at an interface on a client device, a request, during a second period, to retrieve, for the first period, a version of at least one of the first data object and the second data object;

in response to the request from a second instance of the enterprise information management application and during the second period to retrieve, for the first period, for the version of the at least one of the first data object and the second data object, generating version information using at least the first metadata, wherein the version of the at least one of the first data object and the second data object for the first period is the same as a version of the at least one of the first data object and the second data object for the second period or different than the version of the at least one of the first data object and the second data object for the second period; and based on permissions associated with the user, displaying, on the client device, the version information and at least a portion of the at least one of the first data object and the second data object.

2. The computer-implemented method of claim 1, wherein the first data object represents at least one physical attribute of the first feature of the organization.

3. The computer-implemented method of claim 1, wherein the first data object represents owner information associated with the first feature of the organization.

4. The computer-implemented method of claim 1, wherein the first feature of the organization includes an asset of the organization.

5. The computer-implemented method of claim 1, wherein the first metadata indicates at least one semantic significance for the at least one of the relationship between the first data object and the second data object during the first period, the first data object during the first period, and the second data object during the first period; and wherein a second metadata indicates at least one semantic significance for at least one of the relationship between the first data object and the second data object during the second period, the first data object during the second period, and the second data object captured during the second period.

6. The computer-implemented method of claim 1, wherein the first metadata indicates at least one business rule for the at least one of the relationship between the first data object and the second data object during the first period, the first data object during the first period, and the second data object during the first period.

7. The computer-implemented method of claim 1, wherein the first metadata indicates a data structure corresponding to the first data object and the second data object during the first period and includes data structure interpretation rules captured during the first period.

8. A system for enterprise information management, comprising:

a memory; and a processor, wherein the memory includes instructions executable by the processor to:

receive first input information, from a first user using a client computing device, that corresponds to a first feature of an organization;

generate, at a first instance of an enterprise information management application and using the first input information, a first data object that represents the first feature of the organization;

generate a second data object based on second input information;

hierarchically associate the second data object with the first data object using the first input information and the second input information;

store first metadata associated with at least one of a relationship between the first data object and the second data object during a first period, the first data object during the first period, and the second data object during the first period;

receive, from a second user at an interface on a client device, a request, during a second period, to retrieve, for the first period, a version of at least one of the first data object and the second data object;

in response to the request from the second user using a second instance of the enterprise information management application and during the second period to retrieve, for the first period, the version of the at least one of the first data object and the second data object, generating version information using at least the first metadata, wherein the version of the at least one of the first data object and the second data object for the first period is the same as a version of the at least one of the first data object and the second data object for the second period or different than the version of the at least one of the first data object and the second data object for the second period; and based on permissions associated with the second user, display the version information and at least a portion of the at least one of the first data object and the second data object.

9. The system of claim 8, wherein the first data object represents at least one physical attribute of the first feature of the organization.

10. The system of claim 8, wherein the first data object represents owner information associated with the first feature of the organization.

11. The system of claim 8, wherein the first feature of the organization includes an asset of the organization.

12. The system of claim 8, wherein the first metadata indicates at least one semantic significance for the at least one of the relationship between the first data object and the second data object during the first period, the first data object during the first period, and the second data object during the first period.

13. The system of claim 8, wherein the first metadata indicates at least one business rule for the at least one of the relationship between the first data object and the second data object during the first period, the first data object during the first period, and the second data object during the first period.

14. The system of claim 8, wherein the first metadata indicates a data structure corresponding to the first data object and the second data object during the first period.

15. A non-transitory computer-readable storage medium, comprising executable instructions that, when executed by a processor, facilitate performance of operations, comprising:

generating, at a first instance of an enterprise information management application and using first input information, a first data object that represents a first feature of an organization;

generating a second data object based on second input information;

hierarchically associating the second data object with the first data object using the first input information and the second input information;

storing first metadata associated with at least one of a relationship between, the first data object and the second data object during a first period, the first data object during the first period, and the second data object during the first period;

receiving, from a second user at an interface on a client device, a request, during a second period, to retrieve, for the first period, a version of at least one of the first data object and the second data object;

in response to the request from the second user using a second instance of the enterprise information management application and during the second period to retrieve, for the first period, the version of the at least one of the first data object and the second data object, generating version information using at least the first metadata, wherein the version of the at least one of the first data object and the second data object for the first period is the same as a version of the at least one of the first data object and the second data object for the second period or different than the version of the at least one of the first data object and the second data object for the second period; and based on permissions associated with the second user, displaying, at the client device, the version information and at least a portion of the at least one of the first data object and the second data object.

16. The non-transitory computer-readable storage medium of claim 15, wherein the first data object represents owner information associated with the first feature of the organization.

17. The non-transitory computer-readable storage medium of claim 15, wherein the first feature of the organization includes an asset of the organization.

18. The non-transitory computer-readable storage medium of claim 15, wherein the first metadata indicates at least one semantic significance the at least one of the relationship between the first data object and the second data object during the first period, the first data object during the first period, and the second data object during the first period.

19. The non-transitory computer-readable storage medium of claim 15, wherein the first metadata indicates at least one business rule of the at least one of the relationship between the first data object and the second data object during the first period, the first data object during the second period, and the second data object during the first period.

20. The non-transitory computer-readable storage medium of claim 15, wherein the first metadata indicates a data structure corresponding to the first data object and the second data object during the first period.

* * * * *